(12) United States Patent
Jain et al.

(10) Patent No.: US 12,380,728 B2
(45) Date of Patent: Aug. 5, 2025

(54) ATTENTION DRIVEN AND LATENT FINGERPRINT RECOGNITION NETWORK

(71) Applicant: Board of Trustees of Michigan State University, East Lansing, MI (US)

(72) Inventors: Anil K. Jain, Okemos, MI (US); Steven Grosz, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 17 days.

(21) Appl. No.: 18/427,971

(22) Filed: Jan. 31, 2024

(65) Prior Publication Data

US 2024/0412553 A1   Dec. 12, 2024

Related U.S. Application Data

(60) Provisional application No. 63/445,786, filed on Feb. 15, 2023.

(51) Int. Cl.
| | | |
|---|---|---|
| *G06V 40/12* | (2022.01) | |
| *G06V 10/74* | (2022.01) | |
| *G06V 10/82* | (2022.01) | |

(52) U.S. Cl.
CPC ........ *G06V 40/1365* (2022.01); *G06V 10/761* (2022.01); *G06V 10/82* (2022.01)

(58) Field of Classification Search
CPC ... G06V 40/1365; G06V 10/761; G06V 10/82
See application file for complete search history.

(56) References Cited

U.S. PATENT DOCUMENTS

| 7,986,820 B2 | 7/2011 | Moghaddam |
|---|---|---|
| 10,679,037 B2 | 6/2020 | Kim et al. |
| 2022/0327189 A1 | 10/2022 | Belli et al. |

(Continued)

FOREIGN PATENT DOCUMENTS

IN   202211041218 A  *  7/2022

OTHER PUBLICATIONS

Cao & Jain (2018)—(Cao K, Jain AK. Automated latent fingerprint recognition. IEEE transactions on pattern analysis and machine intelligence. Mar. 22, 2018;41(4):788-800.) (Year: 2018).*

(Continued)

*Primary Examiner* — Wassim Mahrouka
(74) *Attorney, Agent, or Firm* — Harness, Dickey & Pierce, PLC

(57) ABSTRACT

A method and system for fingerprint recognition includes generating a first set of feature embeddings for a first image at a feature extractor, generating a second set of feature embeddings for a second image at the feature extractor, generating a third set of embeddings at a first classification head from the first set of feature embeddings, generating a fourth set of embeddings at a second classification head from the first set of feature embeddings, generating a fifth set of embeddings at the first classification head from the second, set of feature embeddings, generating a sixth set of embeddings at the second classification head from the second set of feature embeddings, generating a first similarity score based on the third and fourth sets of embeddings and the fifth and sixth set of embeddings and generating a similarity indicator based on the first similarity score.

22 Claims, 23 Drawing Sheets

(56) References Cited

U.S. PATENT DOCUMENTS

2023/0367854 A1 11/2023 Mukherjee

OTHER PUBLICATIONS

MinNet (Ozturk et al., 2022)—Öztürk Hi, Selbes B, Artan Y. Minnet: Minutia patch embedding network for automated latent fingerprint recognition. InProceedings of the IEEE/CVF Conference on Computer Vision and Pattern Recognition 2022 (pp. 1627-1635). (Year: 2022).*

D. Maltoni, D. Maio, A. K. Jain, and F. Jianjiang, *Handbook of Fingerprint Recognition*, 3rd ed. Springer Science & Business Media, 2022.

B. Dorizzi, R. Cappelli, M. Ferrara, D. Maio, D. Maltoni, N. Houmani, S. Garcia-Salicetti, and A. Mayoue, Fingerprint and On-Line Signature Verification Competitions at ICB 2009, in *International Conference on Biometrics*. Springer, 2009, pp. 725-732.

L. N. Darlow and B. Rosman, "Fingerprint Minutiae Extraction Using Deep Learning," in *IEEE International Joint Conference on Biometrics*. IEEE, 2017, pp. 22-30.

Y. Tang, E. Gao, J. Feng, and Y. Liu, "FingerNet: An Unified Deep Network for Fingerprint Minutiae Extraction," in *IEEE International Joint Conference on Biometrics*. IEEE, 2017, pp. 108-116.

K. Cao and A. K. Jain, "Fingerprint Indexing and Matching: An Integrated Approach," in 2017 *IEEE International Joint Conference on Biometrics*. IEEE, 2017, pp. 437-445.

D. Song and J. Feng. "Fingerprint Indexing Based on Pyramid Deep Convolutional Feature," in *IEEE International Joint Conference on Biometrics*. IEEE, 2017, pp. 200-207.

R. Li, D. Song, Y. Liu, and J. Feng, "Learning Global Fingerprint Features by Training a Fully Convolutional Network with Local Patches," *International Conference on Biometrics*, 2019.

J. J. Engelsma, K. Cao, and A. K. Jain, "Learning a fixed-length fingerprint representation," *IEEE Transactions on Pattern Analysis and Machine Intelligence*, 2019.

C. Lin and A. Kumar, "A CNN-Based Framework for Comparison of Contactless to Contact-Based Fingerprints," *IEEE Transactions on Information Forensics and Security*, vol. 14, No. 3, pp. 662-676, 2018.

X. Dong and J. Shen, "Triplet Loss in Siamese Network for Object Tracking," in *Proceedings of the European conference on computer vision*, 2018, pp. 459-474.

A. Vaswani, N. Shazeer, N. Parmar, J. Uszkoreit, L. Jones, A. N. Gomex, L. Kaiser, and I. Polosukhin, "Attention Is All You Need," *Advances in Neural Information Processing Systems*, vol. 30, 2017.

A. Dosovitskiy, L. Beyer, A. Kolesnikov, D. Weissenborn, X. Zhai, T. Underthiner, M. Dehghani, M. Minderer, G. Heigold, S. Gelly et al., An Image Is Worth 16x16 Words: Transformers For Image Recognition At Scale, *arXiv preprint arXiv: 2010.11929*, 2020.

N. Carion, F. Massa, G. Synnaeve, N. Usunier, A. Kirillov, and S. Zaguruyko, "End-to-End Object Detection With Transformers," in *European conference on computer vision*. Springer, 2020, pp. 213-229.

K. Han, A. Xiao, E. Wu, J. Guo, C. Xu, and Y. Wang, "Transformer in Transformer," *Advances in Neural Information Processing Systems*, vol. 34, pp. 15908-15919, 2021.

Z. Liu, Y. Lin, Y. Cao, H. Hu, Y. Wei, Z. Zhang, S. Lin, and B. Guo, "Swin Transformer: Hierarchical VisionTransformer using Shifted Windows," in *Proceedings of the IEEE/CVF International Conference on Computer Vision*, 2021, pp. 10012-10022.

S. Tandon and A. Namboodiri, "Transformer based Fingerprint Feature Extraction," *arXiv preprint arXiv:2209.03846*, 2022.

S. A. Grosz, J. J. Engelsma, R. Ranjan, N. Ramakrishnan, M. Aggarwal, G. G. Medioni, and A. K. Jain, "Minutiae-Guided Fingerprint Embeddings via Vision Transformers," *arXiv preprint arXiv:2210.13994*, 2022.

K. He, X. Zhang, S. Ren, and J. Sun, "Deep Residual Learning for Image Recognition, " in *Proceedings of the IEEE conference on computer vision and pattern recognition*, 2016, pp. 770-778.

S. Minaee, A. Abdolrashidi, H. Su, M. Bennamoun, and D. Zhang, "Biometrics recognition using deep learning: a survey," *arXiv preprint or Xiv:1912.00271*, 2019.

S. Khan, M. Naseer, M. Hayat, S. W. Zamir, F. S. Khan, and M. Shah, "Transformers in Vision: A survey," *ACM Computing Surveys*, vol. 54, No. 10s, pp. 1-41, 2022.

T. Chugh, K. Cao, and A. K. Jain, "Fingerprint Spoof Buster: Use of Minutiae-Centered Patches," *IEEE Transactions on Information Forensics and Security*, vol. 13, No. 9, pp. 2190-2202, 2018.

J. J. Engelsma and A. K. Jain, "Generalizing Fingerprint Spoof Detector: Learning a One-Class Classifier," in *International Conference on Biometrics*. IEEE, 2019, pp. 1-8.

D. M. Uliyan, S. Sadeghi, and H. A. Jalab, "Anti-spoofing method for fingerprint recognition using patch based deep learning machine," *Engineering Science and Technology, an International Journal*, vol. 23, No. 2, pp. 264-273, 2020.

S. A. Grosz, T. Chugh, and A. K. Jain, "Fingerprint Presentation Attack Detection: A Sensor and Material Agnostic Approach," in *IEEE International Joint Conference on Biometrics*. IEEE, 2020, pp. 1-10.

H. Kim, X. Cui M.-G. Kim, and T. H. B. Nguyen, "Fingerprint generation and presentation attack detection using deep neural networks," in *IEEE*, 2019, pp. 375-378.

J. J. Engelsma, S A. Grosz, and A. K Jain, "PrintsGAN: Synthetic Fingerprint Generator," *IEEE Transactions on Pattern Analysis and Machine Intelligence*, 2022.

S. A. Grosz and A. K. Jain, "SpoofGAN: Synthetic Fingerprint Spoof Images," *IEEE Transactions on Information Forensics and Security*, 2022.

A. B. V. Wyzykowski and A. K. Jain, "Synthetic Latent Fingerprint Generator," *IEEE/CVF Winter Conference on Applications of Computer Vision*, 2022.

D. Bahdanau, K. Cho, and Y. Bengio, "Neural Machine Translation By Jointly Learning To Align And Translate," *arXiv preprint arXiv:1409.0473*, 2014.

Y. Zhong and W. Deng, "Face Transformer For Recognition," *arXiv preparint arXiv:2103.14803*, 2021.

J. Huang, W. Luo, W. Yang, A. Zheng, F. Lian and W. Kang, "FVT: Finger Vein Transformer for Authentication," *IEEE Transactions on Instrumentation and Measurement*, 2022.

M. B. Alejo, "Unconstrained Ear Recognition Using Transformers," *Jordanian Journal of Computers and Information Technology*, vol. 7, No. 4, 2021.

J P. Delgado-Santos, R. Tolosana, R. Guest, F. Deravi, and R. Vera-Rodriguez," Exploring Transformers for Behavioural Biometrics: A Case Study in Gait Recognition," *arXiv preprint arXiv2206.01441*, 2022.

G. Stragapede, P. Delgado-Santos, R. Tolosana, R. Vera-Rodriguez, R. Guest, and A. Morales, "Mobile Keystroke Biometrics Using Transformers," *arXiv preprint arXiv:2207.07596*, 2022.

J. Deng, J. Guo, N. Xue, and S. Zafeiriou, "Arcface: Additive Angular Margin Loss For Deep Face Recognition," in *Proceedings of the IEEE/CVF conference on computer vision and pattern recognition*, 2019, pp. 4690-4699.

H. I. Öztürk, B. Selbes, and Y. Artan, "MinNet: Minutia Patch Embedding Network for Automated Latent Fingerprint Recognition" in *Proceedings of the IEEE/CVF Conference on Computer Vision and Pattern Recognition*, 2022, pp. 1627-1635.

S. A. Grosz, J. J. Engelsma, E. Liu, and A. K. Jain, "C2CL: Contact to Contactless Fingerprint Matching," *IEEE Transactions on Information Forensics and Security*, vol. 17, pp. 196-210, 2021.

S. Tang, C. Han, M. Li, and T. Guo, "An end-to-end Algorithm Based on Spatial Transformer for Fingerprint Matching," in *7th International Conference on Computer and Communication Systems*, IEEE, 2022, pp. 320-325.

Z. He, E. Liu, and Z. Xiang, "Partial Fingerprint Verification via Spatial Transformer Networks," in *IEEE International Joint Conference on Biometrics*, IEEE, 2020, pp. 1-10.

A. Dabouei, S. Soleymani, J. Dawson, and N. M. Nasrabadi, "Deep Contactless Fingerprint Unwarping," in *International Conference on Biometrics*. IEEE, 2019, pp. 1-8.

(56) References Cited

OTHER PUBLICATIONS

M. Jaderberg, K. Simonyan, A. Zisserman, and K. Kavukcuoglu, "Spatial Transformer Networks," *Advances in Neural Information Processing Systems*, vol. 28, 2015.

D. P. Kingma and J. Ba, "ADAM: A Method for Stochastic Optimization," *arXiv preprint arXiv:1412.6980*, 2014.

I. Loshchilov and F. Hutter, "Decoupled weight decay regularization," arXiv preprint arXiv:1711.05101, 2017.

R. Wightman, "Pytorch image models," https://github.com/rwightman/pytorch-image-models, 2019.

S. Yoon and A. K. Jain, "Longitudinal study of fingerprint recognition," *Proceedings of the National Academy of Sciences*, vol. 112, No. 28, pp. 8555-8560, 2015.

C. J. Watson and C. L. Wilson, "NIST Special Database 4," *Fingerprint database, National Institute of Standards and Technology*, vol. 17, No. 77, p. 5, 1992.

G. P. Fiumara, P. A. Flanagan, J. D. Grantham, K. Ko, K. Marshall, M. Schwarz, E. Tabassi, B. Woodgate, and C. Boehnen, "NIST special databse 302: Nail to nail fingerprint challenge," National Institute of Standards and Technology, Gaithersburg, MD, Tec. Rep. NIST.TN.2007, 2019. [Online]. Available: https://doi.org/10.6028/INST.TN.2007.

L. Ericson and S. Shine, "Evaluation of Contactless versus Contact Fingerprint Data, Phase 2 (Version 1.1)," DOJ Office Justice Programs, I. ManTech Adv. Syst. Int., Fairmont, WV, Tech. Rep. 249552, 2015.

D. Deb, T. Chugh, J. Engelsma, K. Cao, N. Nain, J. Kendall, and A. K. Jain, "Matching Fingerphotos to Slap Fingerprint Images," *arXiv preprint arXiv:1804.08122*, 2018.

P. Birajadar, M. Haria, P. Kulkarni, S. Gupta, P. Joshi, B. Singh, and V. Gadre, "Towards smartphone-based touchless fingerprint recognition," Sadhand, vol. 44, No. 7, pp. 1-15, 2019.

C. Lin and A. Kumar, "Matching Contactless and Contact-Based Conventional Fingerprint Images for Biometrics Identification," *IEEE Transactions on Image Processing*, vol. 27, No. 4, pp. 2008-2021, 2018.

C. I. Watson, "NIST Special database 14," *Fingerprint Database, US National Institute of Standards and Technology*, 1993.

D. Mario, D. Maltoni, R. Cappelli, J.L. Wayman, and A.K. Jain, "FVC2002: Second Fingerprint Verification Competition," htt.

D. Maio, D. Maltoni, R. Cappelli, J.L. Wayman, and A.K. Jain, "Fvc2004," http://bias.csr.unibo.it/fvc2004/, 2004.

M. D. Garris and M. D. Garris, NIST Special Database 27: *Fingerprint Minutiae from Latent and Matching Tenprint Images*. US Department of Commerce, National Institute of Standards and Technology, 2000.

A. K. Jain and J. Feng, "Latent Fingerprint Matching," *IEEE Transactions on Pattern Analysis and Machine Intelligence*, vol. 33, No. 1, pp. 88-100, 2010.

K. Cao and . K. Jain, "Automated Latent Fingerprint Recognition," *IEEE Transations on Pattern Analysis and Machine Intelligence*, vol. 41, No. 4, pp. 788-800, 2018.

K. Cao, D.-L. Nguyen, C. Tymoszek, and A. K. Jain, "End-to-End Latent Fingerprint Search," *IEEE Transactions on Information Forensics and Security*, vol. 15, pp. 880-894, 2019.

\* cited by examiner

| Method | # Correctly Predicted | # Spurious | TAR (%) @ FAR=0.01 % (0.1%) | Rank-1 (%) With Gallery of 100K |
|---|---|---|---|---|
| Original Images | 2,606 | 3,676 | 51.94 (57.75) | 56.59 |
| Enhanced by MSU-AFIS | 2,329 | 4,678 | 38.76 (44.96) | 48.06 |
| Enhanced by FingerNet | 2,460 | 5,147 | 39.15 (47.29) | 47.29 |
| Enhanced by FingerGAN | 2,939 | 7,385 | 52.71 (57.36) | 58.14 |
| Enhanced by LFR-Net (Proposed) | 3,118 | 5,536 | 55.04 (65.12) | 58.14 |

FIG. 2

AFR-NET ARCHITECTURE DETAILS — 16

| LAYER NAME | LAYER TYPE | OUTPUT DIM. | PARAMETERS |
|---|---|---|---|
| SPATIAL ALIGNMENT MODULE | | | |
| 0. INPUT | - | 3 x 224 x 224 | |
| 1. $LOC_1$ | CONV2D | 16 x 224 x 224 | K=7x7, PADDING=3 |
| 2. $LOC_2$ | MAXPOOL | 16 x 112 x 112 | K=2x2, STRIDE=2 |
| 3. $LOC_3$ | CONV2D | 24 x 112 x 112 | K=5x5, PADDING=2 |
| 4. $LOC_4$ | MAXPOOL | 24 x 56 x 56 | K=2x2, STRIDE=2 |
| 5. $LOC_5$ | CONV2D | 32 x 56 x 56 | K=3x3, PADDING=1 |
| 6. $LOC_6$ | MAXPOOL | 32 x 28 x 28 | K=2x2, STRIDE=2 |
| 7. $LOC_7$ | CONV2D | 48 x 28 x 28 | K=3x3, PADDING=1 |
| 8. $LOC_8$ | MAXPOOL | 48 x 14 x 14 | K=2x2, STRIDE=2 |
| 9. $LOC_9$ | CONV2D | 64 x 14 x 14 | K=3x3, PADDING=1 |
| 10. $LOC_{10}$ | MAXPOOL | 64 x 7 x 7 | K=2x2, STRIDE=2 |
| 11. $LOC_{11}$ | LINEAR | 32 | BIAS=TRUE |
| 12. $LOC_{12}$ | LINEAR | 4 | BIAS=TRUE |
| FEATURE EXTRACTION ENCODER | | | |
| 13. $CONV_1$ | CONV2D | 64 x 112 x 112 | K=7x7, PADDING=3, STRIDE=2 |
| 14. $CONV_2$ | CONV2D | 256 x 56 x 56 | 1 x 1, 64 / 3 x 3, 64 / 1 x 1, 256  x3 |
| 15. $CONV_3$ | CONV2D | 512 x 28 x 28 | 1 x 1, 128 / 3 x 3, 128 / 1 x 1, 512  x4 |
| 16. $CONV_4$ | CONV2D | 1024 x 14 x 14 | 1 x 1, 256 / 3 x 3, 256 / 1 x 1, 1024  x6 |
| CNN CLASSIFICATION HEAD | | | |
| 17. $CONV_5$ | CONV2D | 2048 x 7 x 7 | 1 x 1, 512 / 3 x 3, 512 / 1 x 1, 2048  x3 |
| 18. $Z_C$ | LINEAR | 384 | BIAS=TRUE |
| ATTENTION CLASSIFICATION HEAD | | | |
| 19. EMBED | MLP | 384 x 14 x 14 | IN=1024, HID=1024, OUT=384 |
| 20. POS EMBED | CONCAT | 384 x 197 | - |
| 21. $ATTN_{1-12}$ | SELF-ATTENTION + MLP | 384 x 197 | IN=384, HID=1536, OUT=384 |
| 22. $Z_A$ | LINEAR | 384 | BIAS=TRUE |

FIG. 4

```
Compute Similarity Between Input Fingerprint
Pairs with AFR-Net.
 1: Procedure MATCH($I_1$, $I_2$)
 2:        $w_1 := 0.2$
 3:        $w_2 \leftarrow 1 - w_1$
 4:        $w_3 := 0.5$
 5:        $w_4 \leftarrow 1 - w_3$
 6:        $s_l, s_h := [0.3, 0.6]$
 7:
 8:        $Z_c^1, Z_a^1, L_1 \leftarrow$ AF Rnet($I_1$)
 9:        $Z_c^2, Z_a^2, L_2 \leftarrow$ AF Rnet($I_2$)
10:
11:        $s \leftarrow w1(Z_{c1} \cdot Z_{c2}) + w_2(Z_{a1} \cdot Z_{a2})$
12:
13: if $s_l \leq s \leq s_h$ then
14:        kp1, kp2 $\leftarrow$ getCorr($I_1$, $I_2$, $L_1$, $L_2$)
15:        M $\leftarrow$ getHomography(kp1, kp2)
16:        if homographyOK(M) then
17:               $I_1' \leftarrow MI_1$
18:               $C_1, C_2 \leftarrow$ cropOverlap($I_1'$, $I_2$)
19:               $Z_c^1, Z_a^1, \_ \leftarrow$ AF Rnet($C_1$)
20:               $Z_c^2, Z_a^2, \_ \leftarrow$ AF Rnet($C_2$)
21:               $s' \leftarrow w_1(Z_c^1 \cdot Z_c^2) + w_2(Z_a^1 \cdot Z_a^2)$
22:               $s \leftarrow w_3 s + w_4 s'$
23:        End if
24: End if
25:
26: Return s
27: End Procedure
```

FIG. 8

Fingerprint Datasets Used in this Study.

| Train Dataset | # Fingers | # Images |
|---|---|---|
| MSP† | 37,411 | 447,988 |
| NIST SD 302 | 1,600 | 20,008 |
| MSU Self-Collection† | 4,582 | 57,813 |
| PrintsGAN | 34,985 | 524,775 |
| SpoofGAN | 10,000 | 150,000 |
| MSU Finger Photo and Slap Database | 1,243 | 5,220 |
| IIT Bombay Touchless and Touch-based Database | 200 | 1,600 |
| ManTech Phase 2 | 4,535 | 64,061 |
| Synthetic Latent Prints | 2,000 | 16,000 |
| NIST SD 4† | 2,000 | 4,000 |
| Validation Dataset | # Fingers | # Images |
| MSU Finger Photo and Slap Database | 110 | 200 |
| MSP Latent†† | 524 | 1086 |
| NIST SD 302 | 200 | 2528 |
| Test Dataset | # Fingers | # Images |
| FVC 2002 DB1A | 100 | 800 |
| FVC 2002 DB2A | 100 | 800 |
| FVC 2002 DB3A | 100 | 800 |
| FVC 2004 DB1A | 100 | 800 |
| FVC 2004 DB2A | 100 | 800 |
| FVC 2004 DB3A | 100 | 800 |
| NIST SD 14† | 2700 | 5,400 |
| NIST SD 302 | 200 | 2,548 |
| NIST SD 27† | 258 | 516 |
| PolyU Contactless 2D to Contact-based 2D Database | 160 | 960 |
| ZJU Finger Photo and Touch-based Database | 824 | 19,776 |

FIG. 9

AUTHENTICATION (1:1 MATCHING) RESULTS.

| MODEL | # PARAMS. (M) | INFERENCE SPEED‡ (MS) | TAR (%) @ FAR=0.1%* | | | | | | TAR (%) @ FAR=0.01% | | | | |
|---|---|---|---|---|---|---|---|---|---|---|---|---|---|
| | | | FVC 2002 | | | FVC 2004 | | | NIST SD14 | NIST SD302 | NIST SD27 | POLYU | ZJU |
| | | | DB1A | DB2A | DB3A | DB1A | DB2A | DB3A | | | | | |
| VERIFINGER V12.3 | N/A | 600 | 99.96 | 99.86 | 99.54 | 98.79 | 98.46 | 99.86 | 99.93 | 93.26 | 61.63 | 95.39 | 96.88 |
| RESNET50 | 62.21 | 4.34 | 99.50 | 99.93 | 93.96 | 99.96 | 99.36 | 100 | 99.93 | 94.70 | 53.88 | 96.94 | 98.28 |
| RESNET101 | 81.20 | 7.58 | 99.57 | 99.61 | 94.5 | 99.96 | 99.29 | 99.82 | 99.93 | 93.79 | 56.59 | 96.48 | 97.71 |
| VIT | 21.83 | 4.12 | 99.29 | 99.68 | 93.00 | 99.86 | 99.89 | 99.50 | 99.67 | 93.49 | 46.51 | 92.38 | 98.08 |
| SWIN | 52.69 | 11.66 | 99.75 | 99.79 | 92.43 | 99.75 | 99.04 | 99.82 | 99.89 | 95.46 | 44.96 | 96.15 | 98.33 |
| AFR-NET | 85.02 | 8.42 | 99.86 | 99.96 | 98.43 | 100 | 99.36 | 100 | 99.93 | 95.46 | 63.18 | 98.23 | 98.68 |
| RESNET50 | 62.21 | 10.37 | 99.86 | 100 | 95.54 | 100 | 99.32 | 100 | 99.93 | 95.40 | 53.88 | 97.60 | 98.04 |
| RESNET101 | 81.20 | 14.19 | 99.75 | 99.75 | 96.11 | 100 | 99.34 | 100 | 99.89 | 94.62 | 56.59 | 97.15 | 97.78 |
| VIT | 21.83 | 10.11 | 99.54 | 99.75 | 95.04 | 99.93 | 99.21 | 99.82 | 99.74 | 94.25 | 46.51 | 94.08 | 98.29 |
| SWIN | 52.69 | 19.00 | 99.86 | 99.82 | 95.25 | 99.82 | 99.07 | 99.89 | 99.89 | 95.70 | 44.96 | 95.95 | 98.07 |
| AFR-NET | 85.02 | 15.18 | 100 | 99.96 | 99.36 | 100 | 99.64 | 100 | 99.93 | 99.11 | 63.18 | 98.73 | 98.70 |

FIG. 10

| Model | Rank 1 | Rank 5 | Rank 10 | Rank 20 | Rank 100 |
|---|---|---|---|---|---|
| Verifinger v12.3 | 55.04 | 62.02 | 65.89 | 67.44 | 73.64 |
| ResNet50 | 43.02 | 52.33 | 55.81 | 58.91 | 67.05 |
| ResNet101 | 44.96 | 55.81 | 57.75 | 61.24 | 72.09 |
| ViT | 38.37 | 44.57 | 48.06 | 50.78 | 58.91 |
| Swin | 37.98 | 46.12 | 48.06 | 55.43 | 62.79 |
| AFR-Net | 53.10 | 62.79 | 65.50 | 68.6 | 75.58 |

FIG. 12

Ablation Study for AFR-Net.

| Loss | # Images | STN | Realign | FVC 2002 DB1A | FVC 2002 DB2A | FVC 2002 DB3A | FVC 2004 DB1A | FVC 2004 DB2A | FVC 2004 DB3A | NIST SD14 | NIST SD302 | NIST SD27 | PolyU | ZJU |
|---|---|---|---|---|---|---|---|---|---|---|---|---|---|---|
| | | | | TAR (%) @ FAR=0.1% | | | | | | TAR (%) @ FAR=0.01% | | | | |
| Cross Entropy | 760K | No | No | 96.93 | 96.50 | 80.21 | 89.61 | 89.14 | 98.50 | 98.23 | 74.05 | 21.32 | 69.15 | 87.09 |
| ArcFace | 760K | No | No | 98.46 | 99.86 | 92.50 | 99.00 | 98.61 | 99.54 | 99.63 | 92.04 | 39.53 | 91.3 | 97.61 |
| ArcFace | 1.3M | No | No | 99.79 | 99.82 | 97.82 | 99.82 | 98.68 | 99.93 | 99.89 | 94.82 | 58.14 | 97.00 | 98.66 |
| ArcFace | 1.3M | Yes | No | 99.86 | 99.96 | 98.43 | 100 | 99.36 | 100 | 99.93 | 95.46 | 63.18 | 98.23 | 98.68 |
| ArcFace | 1.3M | Yes | Yes | 100 | 99.96 | 99.36 | 100 | 99.64 | 100 | 99.93 | 96.11 | 63.18 | 98.73 | 98.7 |

FIG. 14

Fingerprint Datasets Used In this Study.

| Train Datasets | # Fingers | # Images |
|---|---|---|
| MSP Rolled | 37,411 | 447,988 |
| NIST SD 302 (N2N) (plain and rolled prints) | 1,600 | 20,008 |
| MSU Self-Collection (plain prints) | 4,582 | 57,813 |
| Validation Datasets | # Fingers | # Images |
| NIST SD 302 (N2N) (plain and rolled prints) | 200 | 2,528 |
| MSP Latent | 933 | 2,030 |
| Test Datasets | # Fingers | # Images |
| NIST SD 14 | 2700 | 5,400 |
| NIST SD 302 (N2N) | 200 | 2,548 |
| NIST SD 302 Latents (N2N Latents) | 1,019 | 3,793 |
| IIIT-D MOLF | 1,000 | 12,400 |
| MSP Latent<br>NIST SD 27 | 933<br>258 | 1,866<br>516 |
| PolyU Contactless 2D to Contact-based 2D Database | 160 | 960 |
| ZJU Finger Photo and Touch-based Database | 824 | 19,776 |

FIG. 20

| Layer Type | Output Dim. | Parameters |
|---|---|---|
| Conv2d | 64 × 112 × 112 | k=7x7, Padding=3, Stride=2 |
| Conv2d | 256 × 56 × 56 | [k=1 x 1, ch=64; k=3 x 3, ch=64; k=1 x 1, ch=256] x3 |
| Conv2d | 512 × 28 × 28 | [k=1 x 1, ch=128; k=3 x 3, ch=128; k=1 x 1, ch=512] x4 |
| Conv2d | 1024 × 14 × 14 | [k=1 x 1, ch=256; k=3 x 3, ch=256; k=1 x 1, ch=1024] x6 |
| MLP | 384 × 196 | In=1024, hid=1024, Out=384 |
| Self-Attention + MLP | 384 × 196 | In=384, hid=1536, Out=384 |
| Conv2d Transpose | 384 × 28 × 28 | k=2x2, Stride=2 |
| Conv2d | 384 × 28 × 28 | [k=3 x 3, ch=384]x2 |
| Conv2d Transpose | 192 × 56 × 56 | k=2x2, Stride=2 |
| Conv2d | 192 × 56 × 56 | [k=3 x 3, ch=192]x2 |
| Conv2d Transpose | 96 × 112 × 112 | k=2x2, Stride=2 |
| Conv2d | 96 × 112 × 112 | [k=3 x 3, ch=96]x2 |
| Conv2d Transpose | 48 × 224 × 224 | k=2x2, Stride=2 |
| Conv2d | 48 × 224 × 224 | [k=3 x 3, ch=48]x2 |
| Conv2d | 12 × 224 × 224 | k=1x1 |

FIG. 21

RETURN A RANKED CANDIDATE LIST, GIVEN AN INPUT LATENT FINGERPRINT PROBE ($I_P$) AND GALLERY OF ROLLED FINGERPRINT IMAGES ($I_G$) USING LFR-NET.

```
 1: PROCEDURE MATCH(I_P, I_G)
 2:     // INITIALIZE SCORE WEIGHTS
 3:     w_1, w_2, w_3, w_4 := 0.4, 0.4, 0.18, 0.02
 4:
 5:     // INITIALIZE NO. CANDIDATES PASSED TO 2^ND STAGE.
 6:     K := 1000
 7:
 8:     // INITIALIZE NO. CANDIDATES PASSED TO 3^RD STAGE.
 9:     L := 500
10:
        // NO. CANDIDATES IN GALLERY.
11:     N ← LEN(I_G)
12:
13:     // INITIALIZE SCORE LISTS.
14:     S_1, S_2, S_3 := [0] * N, [0] * K, [0] * L
15:
16:     // EXTRACT GALLERY AND PROBE FEATURES.
17:     M_P, V_P, Z_P ← EXTRACT(I_P)
18:     M_G, V_G, Z_G ← EXTRACT(I_G)
19:
20:     // STAGE 1 MATCHING
21: FOR I IN RANGE(N) DO
22:         M_G, Z_G := M_G[I], Z_G[I]
23:         S_1[I] ← w_1 M_SIMI(M_P, M_G) + w_2 (Z_P^T · Z_G) / (|Z_P||Z_G|)
24:     END FOR
25:     I_G^1, M_G^1, V_G^1, Z_G^1 ← SORTANDFILTERCANDIDATES(S_1)
26:
27:     // STAGE 2 MATCHING
28:     FOR I IN RANGE(K) DO
29:         M_G, V_G, Z_G := M_G^1[I], V_G^1[I], Z_G^1[I]
30:         S_2[I] ← w_1 M_SIMI(M_P, M_G) + w_2 (Z_P^T · Z_G) / (|Z_P||Z_G|)
31:             +w_3 M_SIMI(V_P, V_G)
32:     END FOR
33:     I_G^2, M_G^2, V_G^2, Z_G^2 ← SORTANDFILTERCANDIDATES(S_2)
34:
35:     // STAGE 3 MATCHING
36:     FOR I IN RANGE(L) DO
37:         M_G, I_G, Z_G, V_G := M_G^2[I], I_G^2[I], Z_G^2[I], V_G^2[I]
38:         Z'_P, Z'_G ← REALIGN(I_P, M_P, I_G, M_G)
39:         S_3[I] ← w_1 M_SIMI(M_P, M_G) + w_2 (Z_P^T · Z_G) / (|Z_P||Z_G|)
40:             +w_3 M_SIMI(V_P, V_G) + w_4 (Z'_P^T · Z'_G) / (|Z'_P||Z'_G|)
41:     END FOR
42:     I_G^3, M_G^3, V_G^3, Z_G^3 ← SORTANDFILTERCANDIDATES(S_3)
43:
44:     // RETURN SORTED CANDIDATE LIST.
45:     RETURN I_G^3
46: END PROCEDURE
```

FIG. 23

ATTENTION DRIVEN AND LATENT FINGERPRINT RECOGNITION NETWORK

CROSS-REFERENCE TO RELATED APPLICATION

This application claims the benefit of U.S. Provisional Application No. 63/445,786, filed on Feb. 15, 2023. The entire disclosure of the above application is incorporated herein by reference.

GOVERNMENT SUPPORT

This invention was made with government support under 17STCIN00001 awarded by the Department of Homeland Security. The government has certain rights in the invention.

FIELD

The present disclosure relates to fingerprint recognition and, more specifically, to a system and method for attention-driven and latent fingerprint recognition.

BACKGROUND

Automated fingerprint recognition systems have continued to permeate many facets of everyday life, appearing in many civilian and governmental applications over the last several decades. Due to the impressive accuracy of fingerprint recognition algorithms (0.626% False Non-Match Rate at a False Match Rate of 0.01% on the FVC-ongoing 1:1 hard benchmark), researchers have turned their attention to addressing difficult edge-cases where accurate recognition remains challenging, such as partial overlap between two candidate fingerprint images and cross-sensor interoperability (e.g., optical to capacitive, contact to contactless, latent to rolled fingerprints, etc.), as well as other practical problems like template encryption, privacy concerns, and matching latency for large-scale (gallery sizes on the order of tens or hundreds of millions) identification.

For many reasons, some of which are mentioned above (e.g., template encryption and latency), methods for extracting fixed-length fingerprint embeddings using various deep learning approaches have been proposed. Some of these methods were proposed for specific fingerprint-related tasks, such as minutiae extraction and fingerprint indexing, whereas others were aimed at extracting a single "global" embedding. Of these methods, the most common architecture employed is the convolutional neural network (CNN), often utilizing domain knowledge (e.g., minutiae) and other tricks (e.g., specific loss functions, such as triplet loss) to improve fingerprint recognition accuracy. More recently, motivated by the success of attention-based transformers in natural language processing, the computer vision field has seen an influx of the use of the vision transformer (ViT) architecture for various computer vision tasks.

In fact, two studies have already explored the use of a ViT for learning discriminative fingerprint embedding with limitations. In one example, the VIT model using a pretrained CNN as a teacher model did not give the transformer architecture the freedom to learn its own representation. In another example, the data and choice of loss function used to supervise the transformer model limited the fingerprint recognition accuracy compared to the baseline ResNet50 model. Nonetheless, the complimentary nature between the features learned by the CNN-based ResNet50 model and the attention-based ViT model was noted but did not consider combining the two (CNN and ViT) into a single architecture.

Furthermore, a fusion of global embeddings (e.g., CNN, ViT, or combination of both) and local embeddings (e.g., true minutiae and virtual minutiae) may be expected to improve the performance of a fingerprint recognition model, yet previous methods did not leverage both while maintaining both high accuracy and high throughput. A virtual minutiae is an artificially placed landmark when the true number of minutiae in a poor quality of partial fingerprint is small. Local features, such as minutiae and virtual minutiae, may provide some robustness to partial occlusions and other degradations; however, they are computationally expensive to compute compared to a fixed-length global embedding. A multi-stage matching procedure, where less computationally demanding features are used to first filter the candidate list before employing more expensive features to obtain the final ranked similarity list, presents a desirable trade-off in terms of processing speed and accuracy.

Lastly, for added robustness to matching degraded, poor-quality fingerprints, recognition systems may contain methods for fingerprint image enhancement. However, these methods may be too computationally demanding and/or not suitable to very poor-quality scenarios, such as latent or crime-scene fingerprints. To address these limitations, a light-weight enhancement module specifically trained to remove common degradations associated with latent fingerprints is needed for improved fingerprint recognition performance.

SUMMARY

This section provides a general summary of the disclosure and is not a comprehensive disclosure of its full scope or all of its features.

An attention driven fingerprint recognition network or system is set forth. Likewise, a latent fingerprint recognition network or system is also set forth. The latent fingerprint recognition system uses input from an attention driven fingerprint recognition system.

Among other features, the fingerprint recognition system includes a special enhancement and segmentation module to separate the foreground fingerprint (friction ridge) area from the background and other noise. The fingerprint recognition system also includes a special alignment module for aligning a first fingerprint image and a second fingerprint image under comparison. Feature extraction module performs feature extraction of the first image to obtain a first set of extracted features (containing one global descriptor and multiple local descriptors). The same feature extraction model performs feature extraction of the second image to obtain a second set of extracted features. The first set of extracted features and the second set of extracted features are communicated to a first classification head using a CNN extraction head and are communicated to a second classification head, for example, an attention-based classification head. Furthermore, a CNN-based minutiae extraction model is used to extract minutiae and virtual minutiae sets for the first and second image. Followed by a minutiae descriptor model, which extracts a fixed-length embedding for each n×n pixel patch centered around each minutia and virtual minutia obtained from the respective images. Final similarity scores are obtained via a multi-stage matching algorithm, which first compares the global descriptors and minutiae obtained from both images. Then, similarity between the virtual minutiae sets is computed in the second stage. Finally, if the similarity values are not within a desired range, a reweighting process may be performed, and similarities may again be obtained. For one-to-one comparisons, the three stages may be performed sequentially, and the final similarity score returned after all three stages or at any stage in between. For one-to-many comparisons, the matching candidate list may be reduced by some factor after each stage of comparison, to reduce the overall computation required to obtain the final, ranked similarity list.

The present system provides an alignment module to provide multiple rotated fingerprint images of a single fingerprint as an input to the system. In addition, the system uses a feature extraction encoder that provides an output corresponding to features in the images to both a CNN classification head and an attention classification head. The original image is scored using the CNN classification head and the attention classification head based on the output of the feature extraction encoder. When the similarity scores are close to a match threshold or similarity score threshold, the image is masked and reprocessed through the three classifiers to obtain scores from the CNN classification head and the attention classification head. The original scores from the unmasked image and the scores from the masked image are weighted and combined together in a weighted score, which is then compared with a match threshold to determine whether a match exists.

In one aspect of the disclosure, a method for fingerprint recognition comprises generating a first set of feature embeddings for a first image at a feature extractor, generating a second set of feature embeddings for a second image at the feature extractor, generating a third set of embeddings at a first classification head from the first set of feature embeddings, generating a fourth set of embeddings at a second classification head from the first set of feature embeddings, generating a fifth set of embeddings at the first classification head from the second, set of feature embeddings, generating a sixth set of embeddings at the second classification head from the second set of feature embeddings, generating a first similarity score based on the third set of embeddings and the fourth set of embeddings and the fifth set of embeddings and the sixth set of embeddings and generating a similarity indicator based on the first similarity score.

In another aspect of the disclosure, a method for generating probe minutiae from a probe image, generating probe embeddings from the probe image, generating probe virtual minutiae from the probe image, generating gallery minutiae from gallery images, generating gallery embeddings from the gallery images, generating gallery virtual minutiae from the gallery images, generating first similarity scores based on the probe embeddings, the gallery embeddings, probe minutiae and the gallery minutiae, forming a first list of gallery images based on the first similarity score, determining a second similarity scores score based on the virtual minutiae, rearranging the first list to form a second list based on the second similarity scores, spatially aligning the gallery image to form aligned images and the probe image for the gallery images in the second list, generating third similarity scores for the similarity scores based on the aligned images and the probe image and displaying a third list or a single match of a gallery image based on the third similarity scores.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

FIG. 2 is a table of different methods for determining correspondence with the number of correctly predicted and spuriously predicted instances.

FIG. 4 is a table illustrating various label types in the AFR-Net architecture.

FIG. 8 is a pseudo code of an algorithm for computing a similarity between fingerprint pairs with AFR-net.

FIG. 9 is a table illustrating the number of fingers and the images used to perform the present analysis.

FIG. 10 is a table that provides authentication for various types of models including the present model in the bottom line of the table.

FIG. 12 is a table for close set identification performance on the NIST-SD 27 gallery.

FIG. 14 is a table showing an ablation study for AFR-Net.

FIG. 20 is a table of datasets used in the present system.

FIG. 21 is a table of architectural details of the LFAR-Net system.

FIG. 23 is a high-level algorithm for performing LFR-Net.

Corresponding reference numerals indicate corresponding parts throughout the several views of the drawings.

DETAILED DESCRIPTION

Example embodiments will now be described more fully with reference to the accompanying drawings.

Figure 1A:
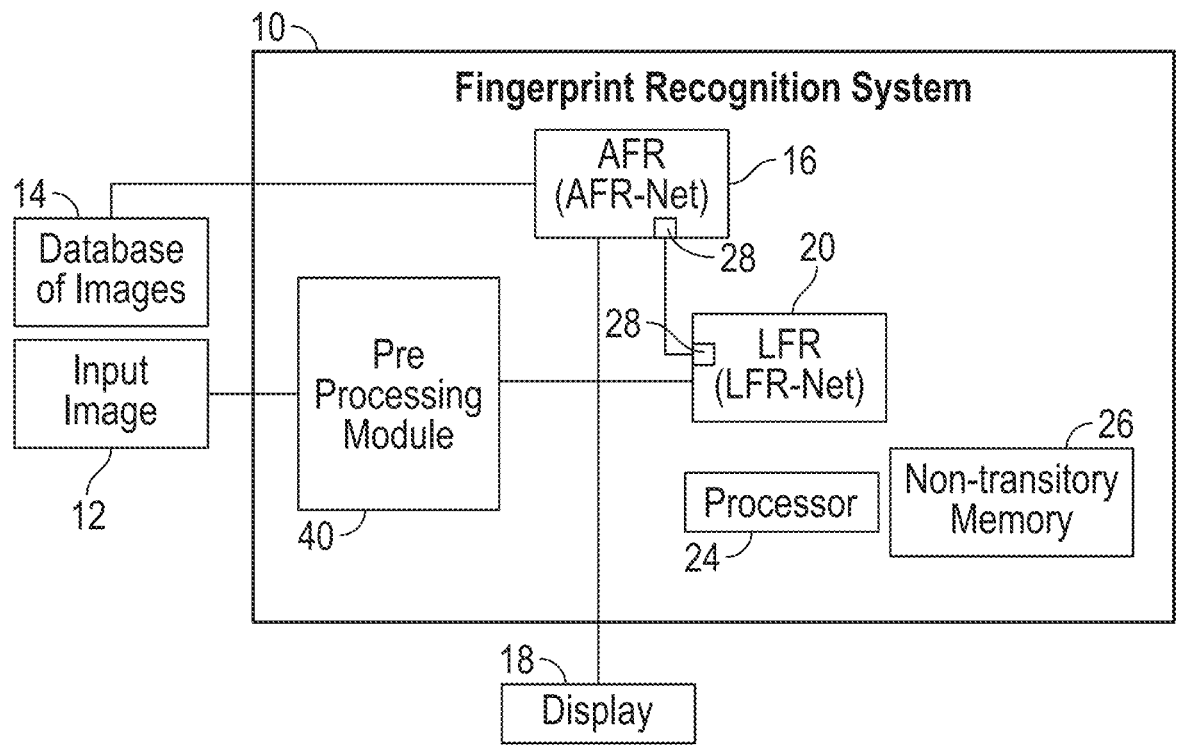
FIG. 1A is a block diagrammatic view of the fingerprint recognition system according to the present disclosure.

Referring now to FIG. 1A, a high-level block diagrammatic view of a fingerprint recognition system 10 is illustrated. The system 10 receives input images 12 that are to be recognized by comparison to images in a database 14. The images in the database 14 may be referred to as a group of images or gallery, each of which is a gallery image. Various types and combinations of databases 14 or galleries may be used including but not limited to law enforcement databases. The system 10 includes an Attention-Driven Fingerprint Recognition Network 16 (AFR-Net 16) details of which are provided below. The AFR-Net 16 may perform recognition on its own and generate a screen display 18 indicative of an input image 12 matching an image in the database 14. The display may, for example, Provide a name or a match or an indicator the no match was found.

A latent fingerprint recognition system or network (LFR-Net) 20 may generate a screen display corresponding to a match. The LFR-Net 20 uses embedding inputs from the AFR-Net 16 as an intermediate step. Details of the operation of the systems are provided in greater detail below.

The system 10 may be implemented in one or more processors 24, which may be controllers, General Processing Units (GPSs) or processors 24 that are in communication with one or more memories such as a non-transitory computer readable medium such as a memory 26 that includes machine-readable instructions that are executable by the controller or processor 24. The machine-readable instructions when executed perform the steps of the method. Some specific examples of processors used as one controller of a plurality of controllers are set forth below. Each subsystem such as AFR-Net 16 and LFR-Net 20 may have separate controllers. The AFR-Net 16 and the LFR-Net 20 may intercommunicate through interfaces 28 so that specific data such as embeddings may be shared therebetween. The memory 26 represents memory that may be programmed to perform various functions including those set forth in the AFR-Net16 and the LFR-net 20.

In the following disclosure, additional attention-based models that bridge the gap between purely CNN and purely attention-based models are used in order to leverage the benefits of each. Toward this end, two ViT variants (vanilla ViT and Swin) along with two variants of a CNN model (ResNet50 and ResNet101) are used for fingerprint recognition. In addition, the AFR-Net 16 (Attention-Driven Fingerprint Recognition Network), consists of a shared feature extraction and parallel CNN and attention classification layers.

Figure 1B:
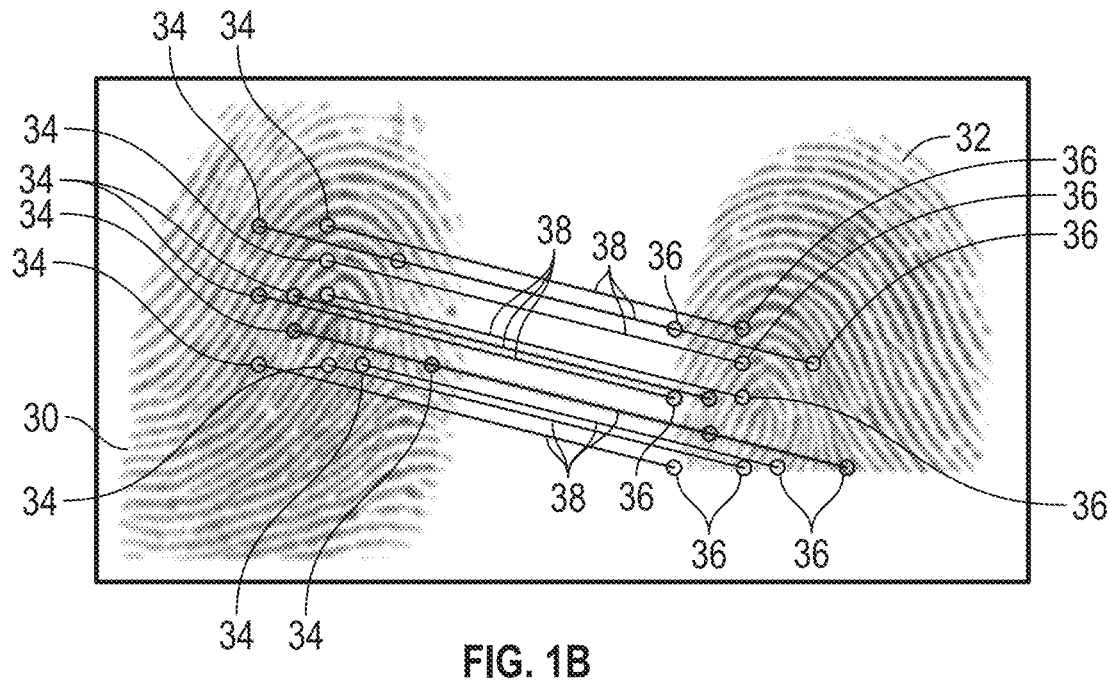
FIG. 1B is two fingerprints showing correspondence between features for the same fingerprint.

Referring now also to FIG. 1B, the first fingerprint 30 is to be matched with a second fingerprint 32. The first fingerprint 30 may represent one of be in database of images 14. The second fingerprint 32 may be referred to as an unidentified fingerprint or a probe fingerprint whose identity is unknown. The fingerprint 30 has various features 34 that are to be matched with the features 36 of fingerprint 32 using the system 10. As can be seen, the fingerprint 30 is more complete than the fingerprint 32 which has only a portion of the fingerprint 30. This is typical of fingerprints lifted from a crime scene of which the identity is sought. Partial alignment, segmenting and enhancement may be used to increase the identification or matching of the system. The features identified may be referred to as embeddings. The embeddings may be across the whole fingerprint or in masked off areas as local embeddings.

Models are usually trained to extract a single, global embedding representing the identity of a given fingerprint image. Global embedding is used for the entire fingerprint. However, local features or local embeddings in a predetermined area of the print may also be useful. For both CNN-based and attention-based models, the intermediate feature maps encode local features that are also useful for relating two candidate fingerprint images. Correspondence between these local features can be used to guide the network in placing attention on overlapping regions of the images in order to make a more accurate determination of whether the images are from the same finger. That is, some data that is non-overlapping may be masked and not used in the matching determination. Additionally, these local features are useful in explaining the similarity between two candidate images by directly visualizing the corresponding key features, as shown by the correspondence lines 38 in FIG. 1B.

Pre-processing module 40 may perform various functions as set forth below. Spatial alignment, segmentation, and enhancement are examples of the functions that may be performed for either the AFR-Net 16, the LFR-Net 20, or both. A description of a fingerprint spatial alignment, segmentation and enhancement is provided. For example, segmentation and enhancement may successfully remove noise and background from input fingerprint images, especially latent fingerprints. A multi-stage matching procedure is also described, which leverages both global (AFR-Net embeddings) and local features (minutiae and virtual minutiae) to achieve both high accuracy and high throughput.

The system 10 and the description below provide analysis of various attention-based architectures for fingerprint recognition. A novel architecture for fingerprint recognition, AFR-Net 16 incorporates attention layers into a ResNet architecture. State-of-the-art (SOTA) fingerprint recognition performance (authentication and identification) across several diverse benchmark datasets is set forth, including intra-sensor, cross-sensor, contact to contactless, and latent to rolled fingerprint matching. A novel use of local embeddings extracted from intermediate feature maps to both improve the recognition accuracy and explainability of the present system is also provided. Ablation analysis demonstrates the importance of each aspect of the present, including choice of loss function, training dataset size, use of spatial alignment module, and use of local embeddings to refine the global embeddings. Design of an end-to-end latent fingerprint recognition pipeline using deep learning methods, including algorithms for segmentation, enhancement, minutiae extraction, and a fusion of global and local embeddings. State-of-the-art (SOTA) latent to rolled/plain fingerprint search across multiple datasets, including NIST SD 27, NIST SD 302 Latents (N2N Latents), MSP Latent, and MOLF datasets are provided. Faster search speed (low latency) due to using a multi-stage search scheme while maintaining state-of-the-art SOTA recognition accuracy for both closed-set and open-set identification is set forth.

Over the last decade, deep learning has seen a plethora of applications in fingerprint recognition, including minutiae extraction, fingerprint indexing, presentation attack detection, synthetic fingerprint generation, and fixed length fingerprint embeddings for recognition. In the following, fixed-length (global) embeddings for fingerprint recognition are provided.

Early studies on extracting global fingerprint embeddings using deep learning used a fully convolutional neural network to produce a final embedding of 256 dimensions. Improved performance of the fixed-length embedding network by incorporating minutiae domain knowledge as an additional supervision has been used. Similarly, additional fingerprint domain knowledge (minutiae and core point regions) has been incorporated into a multi-Siamese CNN for contact to contactless fingerprint matching. More recently, the use of vision transformer architecture for extracting discriminative fixed-length fingerprint embeddings has been described, both showing that incorporating minutiae domain knowledge into ViT improved the performance.

Vision Transformers (ViTs) have led to numerous applications across the computer vision field in the past couple of years since they were first introduced for computer vision applications. The general principle of transformers for computer vision is the use of the attention mechanism for aggregating sets of features across the entire image or within local neighborhoods of the image. Attention was originally introduced in 2015 for sequence modeling and has been shown to be a useful mechanism in general for operations on a set of features. Numerous variants of ViT have been proposed for a wide range of computer vision tasks, including image recognition, generative modeling, multi-model tasks, video processing, low-level vision, etc.

Some recent works have explored the use of transformers for biometric recognition across several modalities including face, finger vein, fingerprint, ear, gait, and keystroke recognition. As described below, improvements upon the previous uses of transformers are set forth for fingerprint recognition by evaluating additional attention-based architectures for extracting global fingerprint embeddings.

One step in improving the accuracy of latent to rolled comparison is alleviating the effect of various degradations present in latent fingerprints through preprocessing aimed at enhancing the contrast of the latent fingerprint ridge structure. A multitude of latent enhancement methods have been proposed over the years, ranging from classical computer vision techniques to state of the art deep learning methods. Early enhancement efforts utilized contextual filtering and directional filtering, but these methods were limited in their effectiveness for enhancing latent fingerprints due to corrupted ridge structures and unreliable orientation and frequency estimation compared to that of plain and rolled fingerprints. This led to many subsequent studies on improving the ridge orientation estimation for latent fingerprints. For example, a combination of polynomial models and Gabor filters were utilized to improve latent orientation estimation. Similarly, an orientation patch dictionary and Gabor filters have been utilized for latent enhancement. This approach was extended by utilizing local orientation dictionaries, which increased the flexibility of the approach to find better orientation fields. However, the variance in ridge frequency of distorted latent fingerprints limited the utility of these methods in improving overall matching accuracy. Subsequent efforts introduced deep neural networks to improve the enhancement of latent fingerprints. In addition to a combination of short-time Fourier transform (STFT) and Gabor filters, a convolutional neural network (CNN) autoencoder was trained to enhance latent fingerprints. Variants of the CNN-based approach were also proposed. Generative adversarial networks (GANs) have also been adopted for latent fingerprint enhancement and these methods have shown promise in restoring ridge and valley structures. However, as shown in FIG. 2, the various methods have a tendency to hallucinate ridge lines and produce spurious minutiae that may degrade matching performance. Furthermore, critical to the success of many of these methods was access to large databases of mated rolled and latent fingerprint image pairs for training.

In the present disclosure, the efficient CNN architecture of Squeeze U-Net has been used for latent enhancement without access to any latent training data. Instead, a series of data augmentations are employed on a dataset of rolled and plain fingerprint impressions in order to mimic the degradations present in latent fingerprints and the network is trained to restore the degraded images to their original input. A comparison between the performance enhancement network and several previous baselines is provided with reference to ablation as described below.

Despite recent success of deep learning global representations for fingerprint matching, known latent fingerprint recognition systems utilize minutiae-based matchers for computing final similarity scores between latent and rolled image pairs. For example, variants of the local similarity assignment algorithm have been utilized for computing minutiae similarity scores. The extended clique model for minutiae matching has been utilized. FingerGAN used Verifinger v12.1 for matching and multi-scale fixed-length embeddings have been for indexing to reduce the potential candidate list in combination with MSU-AFIS for computing the similarity scores. Even though deep learning networks are used within many of these minutiae-based methods to produce local minutiae descriptors around minutiae points, no existing study directly leveraged a global embedding as an additional similarity comparison.

In the following the use of a global embedding score for improving the latent to rolled matching performance, in conjunction with local minutiae embeddings for minutiae matching is set forth.

The AFR-Net 16 aspect of the present disclosure shows investigation of several baseline CNN and attention-based models for fingerprint recognition, fusing a CNN-based architecture with attention into a single model to leverage the complimentary representations of each, using intermediate local feature maps to refine global embeddings and reduce uncertainty in challenging pairwise fingerprint comparisons, and using a spatial alignment module to improve recognition performance.

As mentioned above AFR-Net 16 may be used alone and as part of intermediate steps in the LFR-Net 20.

The present system improves initial studies by plying ViT to fingerprint recognition to better establish a fair baseline performance of ViT compared to the CNN-based models. This is accomplished by removing the limitations of the previous studies in terms of choice of supervision and size of training dataset used to learn the parameters of the models. ViT is compared with two variants of the ResNet CNN-based architecture, ResNet50 and ResNet101. A small version ViT with patch size of 16, number of attention heads of 6, and layer depth of 12 was used. The architecture as it presents an adequate trade-off in speed and accuracy compared to other ViT architecture variants.

The performance of a popular ViT successor, Swin, which utilizes a hierarchical structure and shifted windows for computing attention within local regions of the image is compared. Specifically, a small Swin architecture with patch size of 4, window size of 7, and embedding dimension of 96 is set forth. For another strong baseline comparison, the latest version of the SOTA fingerprint recognition system from Neurotechnology, Verifinger v12.3, for the evaluations was used.

Figure 3:
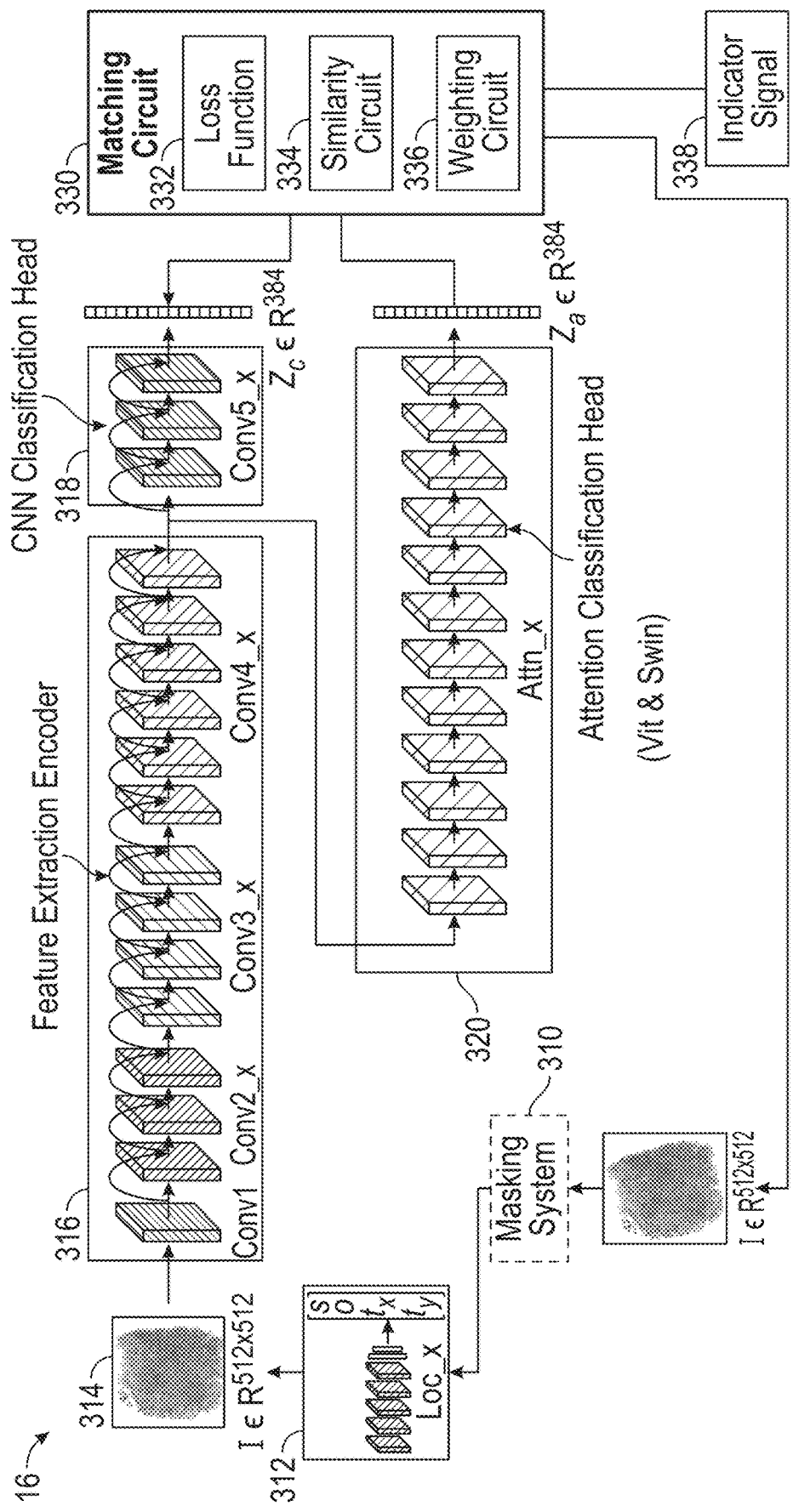
FIG. 3 is a high-level block diagrammatic overview of the AFR-Net system.

Referring now to FIGS. 3 and 4, ViT and ResNet embeddings are used in a single architecture, referred to as AFR-Net 16. AFR-Net 16 consists of an optional masking system 310 that receives two fingerprint images for comparison. One of the images may be a known image from a database (a gallery image) and one image is an unknown image being identified. The masking system 310 masks selective portions of the fingerprint images as described in greater detail below to obtain local embeddings. As described below, the first time images are compared the masking system 310 is not used and may only be used when the image similarity scores are close. A spatial alignment module 312 is used to receive either masked images or unmasked images and generate spatially aligned images. Different types of spatial transforming networks have been shown to be highly effective in aligning input fingerprints for improved recognition accuracy across a wide range of tasks (e.g., contact to contactless fingerprint matching, partial fingerprint recognition, etc.). Local descriptors used in the spatial alignment procedure are not rotation invariant, the spatial alignment module 312 is used in the AFR-Net 16. The details of the spatial alignment module 312 are given in the table of FIG. 4 along with the details of other portions of the AFR-Net network architecture. In general, Conv2d, MaxPool and Linear were used for the layer type with various output dimensions and parameters.

A CNN feature extraction encoder 316 (encoder) receives the spatially aligned images 314. FIG. 4 has various parameters of the layers of the CNN. In this example, four sets (Conv1-Conv4) having a total of 14 layers were used. The sets are set forth in FIG. 4 with their layer type, output dimensions and parameters. In this example, Conv2d was used as the layer type for all layers. The output of the feature extraction encoder 316 is two sets of feature embeddings. The first set of feature embeddings for the image with the known identity (gallery images) and the second set of feature embeddings is for the image with the unknown identity (probe images).

A CNN classification head 318 receives the feature embeddings of the two images as the first set of feature embeddings and the second set of feature embeddings. The layer type of the CNN classification head 318 were used; Conv2d and Linear. The output of the CNN classification head 318 is Z, which are CNN embeddings.

An attention classification head 320 also receives the feature embeddings of the two images as the first set of feature embeddings and the second set of feature embeddings. The output of the attention classification head 320 is $Z_a$, which are attention embeddings.

The use of the shared alignment module 312 and shared feature extraction encoder 316 greatly reduces the number of parameters compared to using two completely separate networks. Time savings are also realized because the two classification heads may be trained jointly.

Due to the two classification heads, the two classification layers which map each of the two sets of 384-d embeddings, $Z_c$ and $Z_a$, into a softmax output within the matching circuit 330 representing the probability of a sample belonging to one of N classes (identities) in the training dataset. A loss function 332 such as the Additive Angular Margin (ArcFace) loss function is used to encourage intra-class compactness and inter-class discrepancy of the embeddings of each branch. Through an ablation study described below it was found that despite the relatively little use of the loss function in previous fingerprint recognition papers, the ArcFace loss function makes a useful difference in the performance.

The matching circuit 330 includes a similarity circuit 334 that determines the similarity score for the two images. When the similarity score is compared to a similarity score threshold (greater than the similarity score threshold such as 0.36) as set forth below, the two images are identified as matches. When the similarity score is close to the similarity score threshold but not close enough to declare a match, such as, for example, between 0.3 and 0.6, a weighting circuit 336 may be used to weight the local embeddings from masked images with global embeddings from non-masked images as described below.

Intermediate feature maps of the AFR-Net 16 encode local descriptors (i.e., embeddings) of the input images. The local descriptors or local embeddings can be matched between two fingerprint images and used to compute a correspondence between similar regions. Given the surprising accuracy of these local embeddings in locating corresponding points of interest between two images, a strategy to use these corresponding regions of interest as a sort of hard attention for the model to refine the global embeddings based on just the overlapping regions present in both images.

Figure 5:
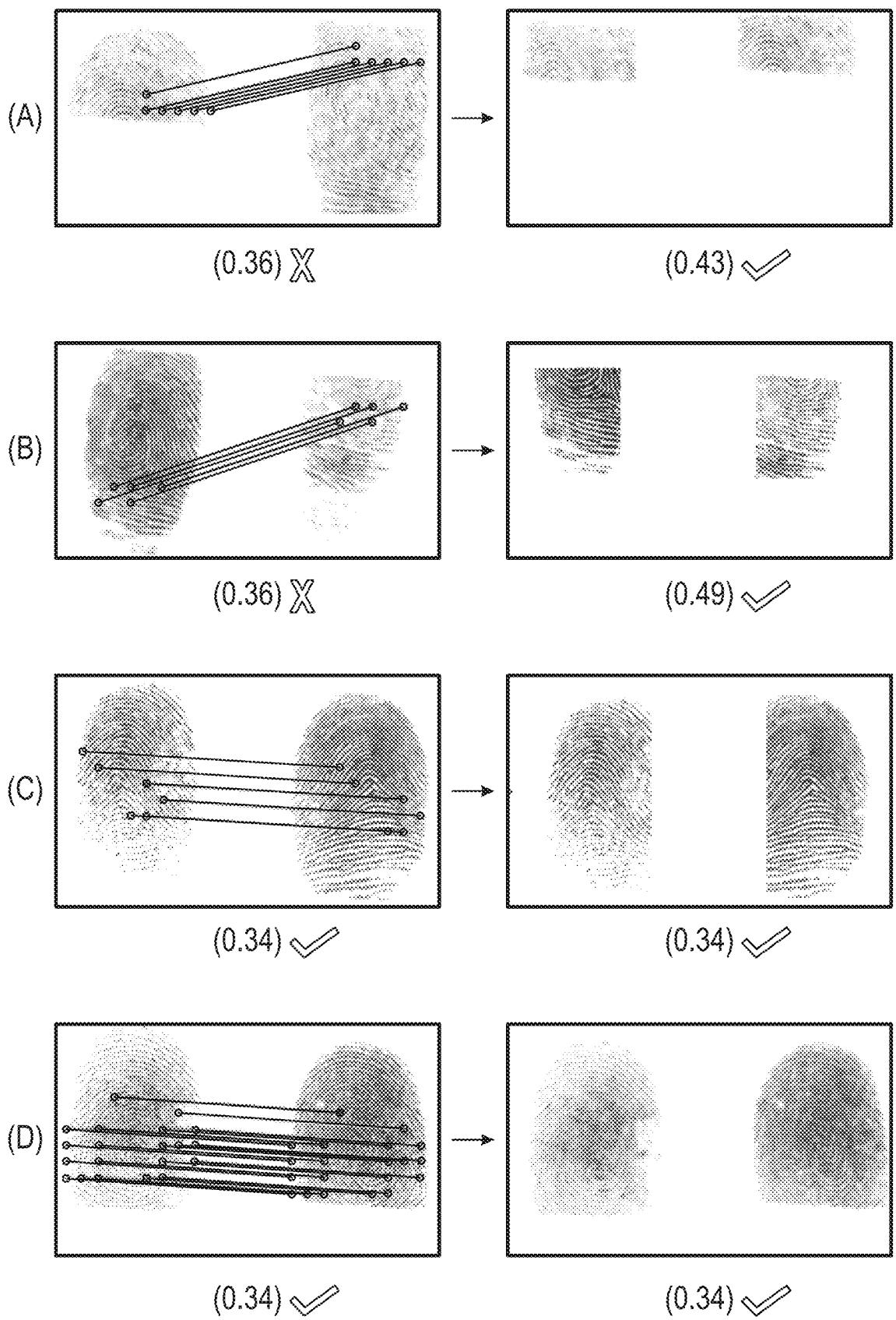
FIG. 5 are examples of genuine and imposter pairs of fingerprint both before and after realignment.

Some examples of this process are demonstrated in FIG. 5, where the correspondence between local embeddings is used to compute an affine transformation between the image pairs. Then, the non-overlapping fingerprint regions are masked in the masking system 310 and the unmasked portions of each image are presented to the AFR-Net 16 for a second time to yield a new set of embeddings. Finally, a second similarity score between the masked images is computed via a cosine similarity between the new embeddings. In the weighting circuit 336, the similarity between the masked regions is combined via a weighted sum with the similarity score obtained from the original images to obtain a final similarity score, which in turn is an indicator for a match and therefore the unknown fingerprint may be identified as corresponding to a known fingerprint and its associated identity.

For ResNet50, ResNet101 either of which may be used in the CNN classification head 318, and AFR-Net 16, the last output of the Conv4 layer is used as the local embeddings, which has dimensions of 14×14×1024. For ViT and Swin that may be used in the attention classification head 320, the final patch embeddings at the output of the last attention layer are used as the local embeddings, which has dimensions of 14×14×384. In all cases, each of these 196 local descriptors corresponds to a single 16×16 patch of the input fingerprint image. The center of each patch is assigned as the key point associated with the corresponding local embedding when computing the correspondence points between two fingerprint images.

Figure 6:
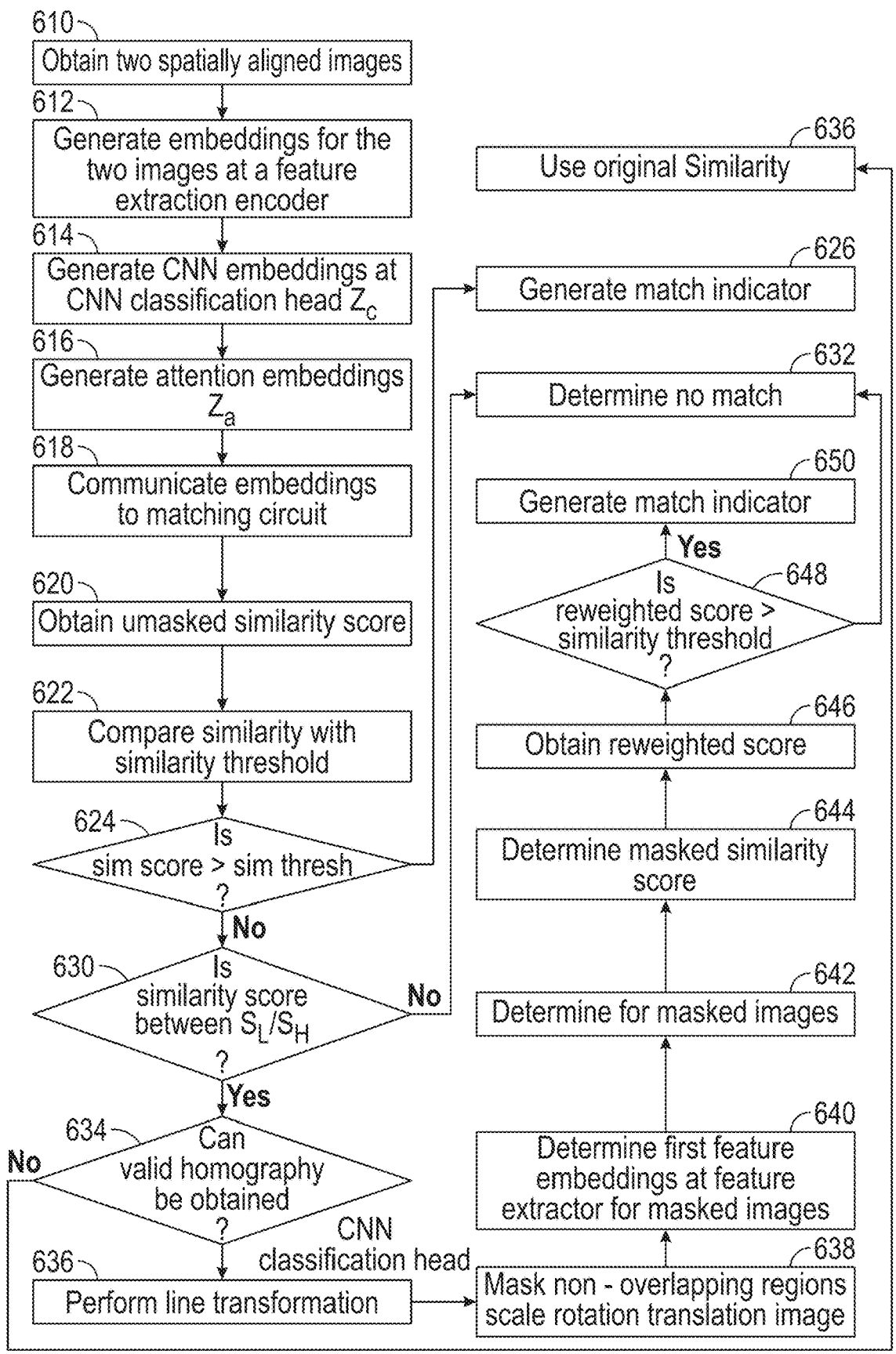
FIG. 6 is a flowchart of a method of operating the AFR-Net system.

Referring now to FIG. 6, the AFR-Net method is set forth in flowchart form is set forth.

In step 610, two spatially aligned images are obtained at the spatial alignment circuit 312. The spatially aligned images correspond to a known image of which the identity is known (a gallery image) and an unknown image (a probe image). In step 612, embeddings for the two images are generated at the feature extraction encoder. That is, two sets of feature embeddings, one for the known or gallery image and one for unknown or probe image is determined. The two sets of feature embeddings are each processed in parallel at the CNN classification head 318 and the attention classification head 320. In step 614, CNN embeddings are generated at the CNN classification head 318. In step 616, the two sets of embeddings from the feature extraction encoder 316 are communicated to the attention classification head 320 from which attention embeddings are generated.

In step 618, the CNN embeddings $Z_c$ and the attention embeddings $Z_a$ for both the gallery image and the probe image are communicated to the matching circuit 330. In step 620, an unmasked similarity score is obtained in step 620. The similarity circuit 334 of the matching circuit 330 may be used. In step 622, the similarity scores are compared with a similarity threshold $S_h$. In step 624, the similarity score and indicator signal 338 may be generated by the matching circuit 330 at step 626. After step 624 indicates the similarity score is not greater than the similarity threshold $S_h$, step 630 may be performed. The remaining steps may be optionally performed to improve the matching results. The use of local descriptors or local embeddings by masking may be performed. In step 630, when the similarity score is not between a low similarity threshold $S_l$ and high similarity threshold $S_h$, step 632 determines that there is no match between the two fingerprints known and unknown. After step 630 and the similarity scores between the two values, step 634 may be performed.

Computing the correspondence between sets of local descriptors or embeddings of two images is time consuming, especially if computing a brute force exhaustive search to establish a 1:1 correspondence between matched descriptors. For this reason, the re-weighting strategy is employed in low certainty scenarios (when the similarity score is close to the match threshold) to keep the amortized latency of the process approximately the same as without the re-weighting process. The local descriptors are utilized if the similarity score between the original global embeddings falls between a specified range [sl, sh]. Values of 0.3 and 0.6 for $s_l$ and $s_h$, respectively, were empirically determined on the validation dataset to work well across all the models.

In step 634, it is determined whether a valid homography computed between corresponding local regions can be obtained (e.g., if the scale, rotation, and/or translation parameters exceed expected limits). In step 634, when homography cannot be obtained, step 636 uses the original similarity score so as to not further degrade the comparison by computing a new set of embeddings from images which have been corrupted due to poorly behaved transformation matrices. In step 636, an affine transformation between the image pairs is an optional step that may be performed. The affine transformation aligns the gallery and probe images further. In step 638, the images may be masked so that the unmasked portions are used for comparison. As is illustrated in FIG. 5 below, the correspondence and comparison between the masked images is illustrated. Details are provided below. After step 638 masked the images at the masking system 310, step 640 determines feature embeddings at the feature extractor for the masked probe and gallery images. In step 642, embeddings for the masked images are determined at the attention classification head and the CNN classification head for the masked probe and gally images. In step 644, a similarity score for the masked probe image and gallery image is determined from the embeddings from each of the heads. Steps 640-644 are essentially repeated for the masked images and are essentially repeated steps 612-618. In step 644, the masked similarity score is obtained. In step 646, a reweighted score may be obtained. That is, the unmasked similarity score and the masked similarity score may be weighted to obtain the reweighted score in step 646. In one example, the masked similarity score was weighted less than the unmasked score. However, in instances where the similarity score is close to the similarity threshold, improved results have been obtained. After step 646 determines the reweighted score, the reweighted score is compared to a similarity threshold in step 648. In step 648, if the reweighted score is not greater than the similarity threshold, step 630 determines no match. In step 648, when the reweighted threshold is greater than similarity threshold, step 650 generates a match indicator.

Figure 7A:
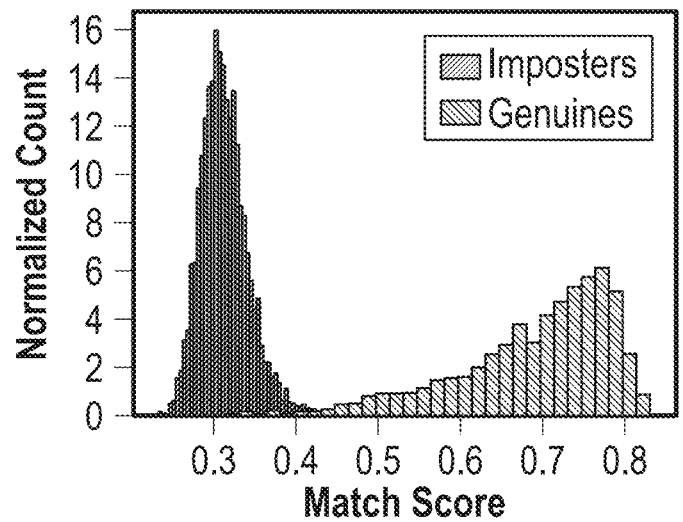
FIG. 7A is a plot of similarity score distributions for original image embeddings for imposter and genuine fingerprints.
Figure 7B:
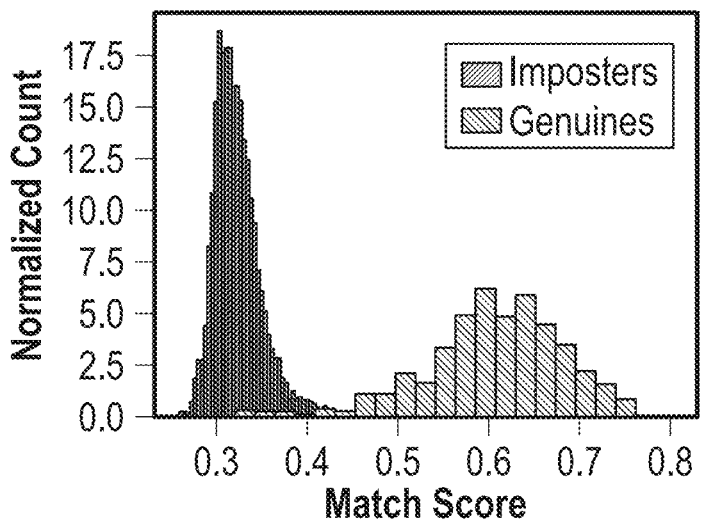
FIG. 7B is a plot of similarity score distributions for original image embeddings after refinement for imposter and genuine fingerprints.
Figure 7C:
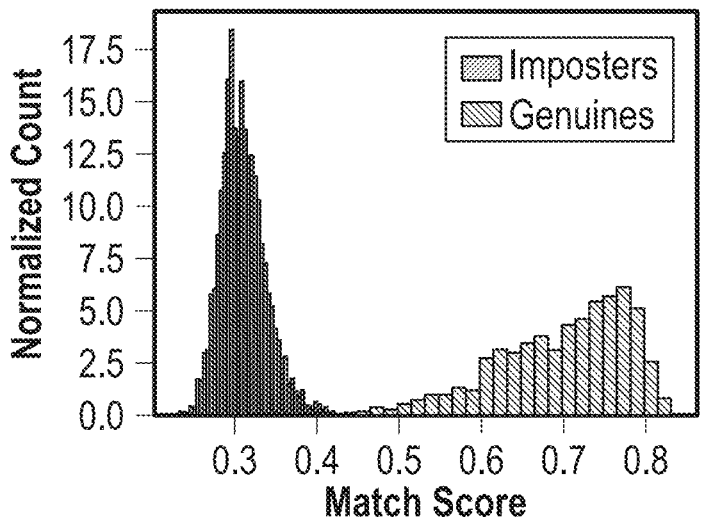
FIG. 7C is a plot of similarity score distributions for weighted average of original and refined embeddings for imposter and genuine fingerprints.

FIG. 7 shows the genuine and imposter score distributions for the AFR-Net 16 on the FVC 2002 DB3A dataset, the biggest increase in performance after re-weighting the predictions using this method was realized. FIG. 7 similarity score distributions for (a) original image embeddings, (b) embeddings after refinement, and (c) weighted average of original and refined embeddings. Similarity scores are computed with the AFR-Net model on the FVC 2002 DB3A dataset, where the TAR @ 0.1% FAR for the original embeddings is 98.43%, 91.32% for the refined embeddings, and 99.36% after the weighted score fusion.

FIG. 8 shows an example of pseudo-code performing the full process.

AFR-Net 16 and all baseline models, excluding Verifinger, were trained with an ArcFace loss function with a margin of 0.5, learning rate of 1e-4, weight decay of 2e-5, and polynomial learning rate decay function with a power of three and minimum learning rate of 1e-5. The AFR-Net 16, ResNet100, and Swin models were trained with a batch size of 64 across four Nvidia Geforce RTX 2080 Ti GPUs, whereas the ResNet50 and ViT models were trained with a batch size of 128. AFR-Net, ResNet50, and ResNet100 were trained with the Adam optimizer and ViT and Swin were trained with an AdamW optimizer. The maximum number of epochs for all models was set to 75; however, the number of epochs trained for the final saved models varied based on the highest validation accuracy computed during training on a hold-out validation dataset. Finally, each model using the pre-trained ImageNet weights made available by the open-sourced pytorch-image-models git repository.

The training and evaluation datasets used, the authentication and identification results achieved by the AFR-Net method in comparison with the baseline methods, latency and performance trade-off between the methods, and an ablation analysis to highlight the contributions of individual components in the system is set forth.

For the training the models set forth herein, a large number of fingerprint recognition datasets with diverse characteristics ranging from rolled fingerprints, plain (i.e., slap) fingerprints, mixture of rolled and plain fingerprints, contactless (e.g., from mobile phone cameras) fingerprints, latent fingerprints (from the Michigan State Police (MSP) Latent Database), and even recently released synthetic fingerprints were used. A small portion of the total training dataset was reserved for validation. In total, the aggregated training dataset contains 1.3M images for training and 3,814 images for validation. Further information regarding the number of unique fingers, images per dataset, and fingerprint type is given in FIG. 9.

The evaluation datasets are just as diverse as the training datasets and include challenging scenarios such as contact to contactless fingerprint matching varying sensor types for both rolled and slap prints (e.g., optical, capacitive, thermal swipe, etc.) latent to rolled fingerprint matching, and even rolled to plain fingerprint matching (as in the case in the NIST SD 302 dataset. About 200 of the 2000 unique fingers in the NIST SD 302 are reserved for testing; these 200 fingers are completely disjoint from the fingers used in the training and validation partitions.

Authentication performance of the present method across 11 different evaluation datasets of varying characteristics.

The results are given in FIG. 10 as the true accept rate (TAR) at a false accept rate (FAR) of 0.01% (FAR=0.1% in the case of the FVC datasets in order to follow the established protocols) and the full Receiver Operating Characteristics (ROC) curves are given in the appendix. Besides for the established protocol on the FVC datasets, all possible genuine and imposter pairs for the evaluations are computed.

According to the results in FIG. 10, AFR-Net outperforms the baseline methods on 9 out of the 11 datasets and shows competitive performance on the two datasets where it comes in second place (99.96% vs. 100% and 99.36% vs. 99.54% for FVC 2002 DB2A and DB3A, respectively). Impressive performance in cross-sensor (TAR=96.11% on NIST SD 302) and contact to contactless matching (TAR=98.73% and TAR=98.70% on PolyU and ZJU datasets, respectively), as well as latent to rolled fingerprint matching on the challenging NIST SD 27 dataset were obtained where AFR-Net outperforms Verifinger v12.3 (TAR=63.18% to TAR=61.63%).

AFR-Net, and even the baseline ResNet and ViT variants, show substantial improvement over previous fixed-length, global representation networks for fingerprint recognition. For example, DeepPrint, one of the top performing models in the open literature, achieves a TAR of 97.53% and 98.55% on FVC 2004 DB1A and NIST SD 14, respectively. However, given the older architectures (Inception v4 in the case of DeepPrint), loss functions, and smaller training datasets, this increase in performance is not all that surprising. In fact, this is why the AFR-Net model was benchmarked against several more recent architectures like ResNet, ViT, and their variants; all of which were trained and evaluated on the same datasets, allowing for a fairer comparison with AFR-Net.

For all the methods, improved performance was obtained using the local embeddings to realign the images as a way to refine the global embeddings and improve the resulting similarity scores. The performance improvement was most pronounced for datasets with frequent partial fingerprints, such as FVC 2002 DB3A and DB1A. For example, the average performance across all the methods on FVC 2002 DB3A improved from 94.46% to 96.26%, a 32.5% reduction in error. Intuitively, this realignment process has the effect of slightly improving the similarity scores between borderline genuine fingerprint pairs, by forcing the network to focus on overlapping regions in the images and does not appreciably affect the borderline imposter scores. Thereby, pushing some of the borderline genuine matches above the rejection threshold.

If comparing just the CNN-based models (ResNet50 and ResNet101) vs. the attention-based models (ViT and Swin), the performance in terms of matching accuracy is quite comparable; however, in terms of number of parameters, ViT and Swin have substantially smaller footprints. As a result, the training time to reach convergence of these networks was significantly faster than the ResNet models, especially for ViT due to its low latency as well (which is comparable to ResNet50). Finally, for the most part, Swin outperformed ViT in terms of accuracy across many of the datasets, but it does have more than twice the parameters and 3 times the latency of ViT, making it perhaps not as preferable in some situations.

Figure 11:
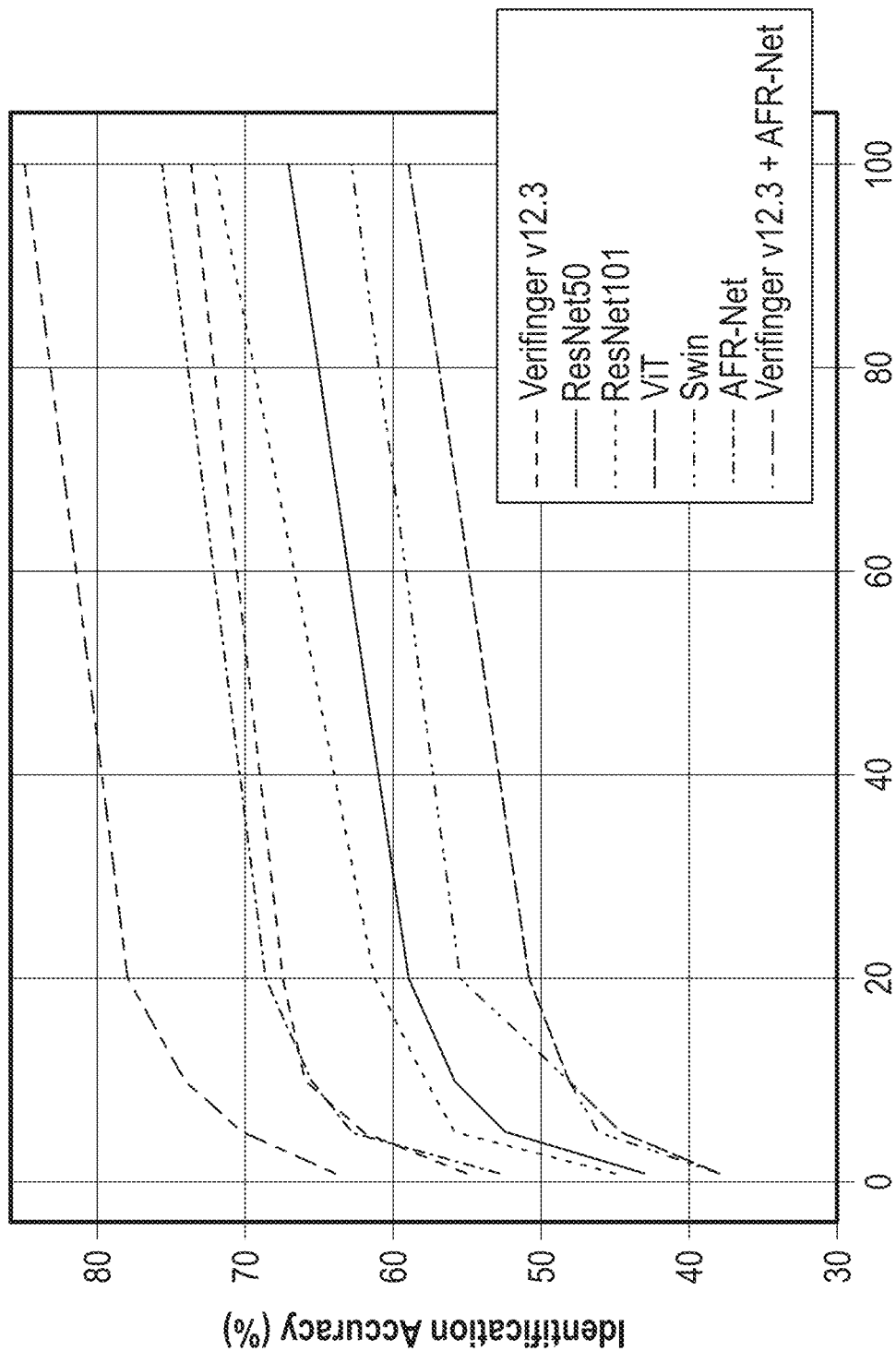
FIG. 11 is a plot of the identification accuracy and the rank for various types of fingerprint recognition.
Figure 13:
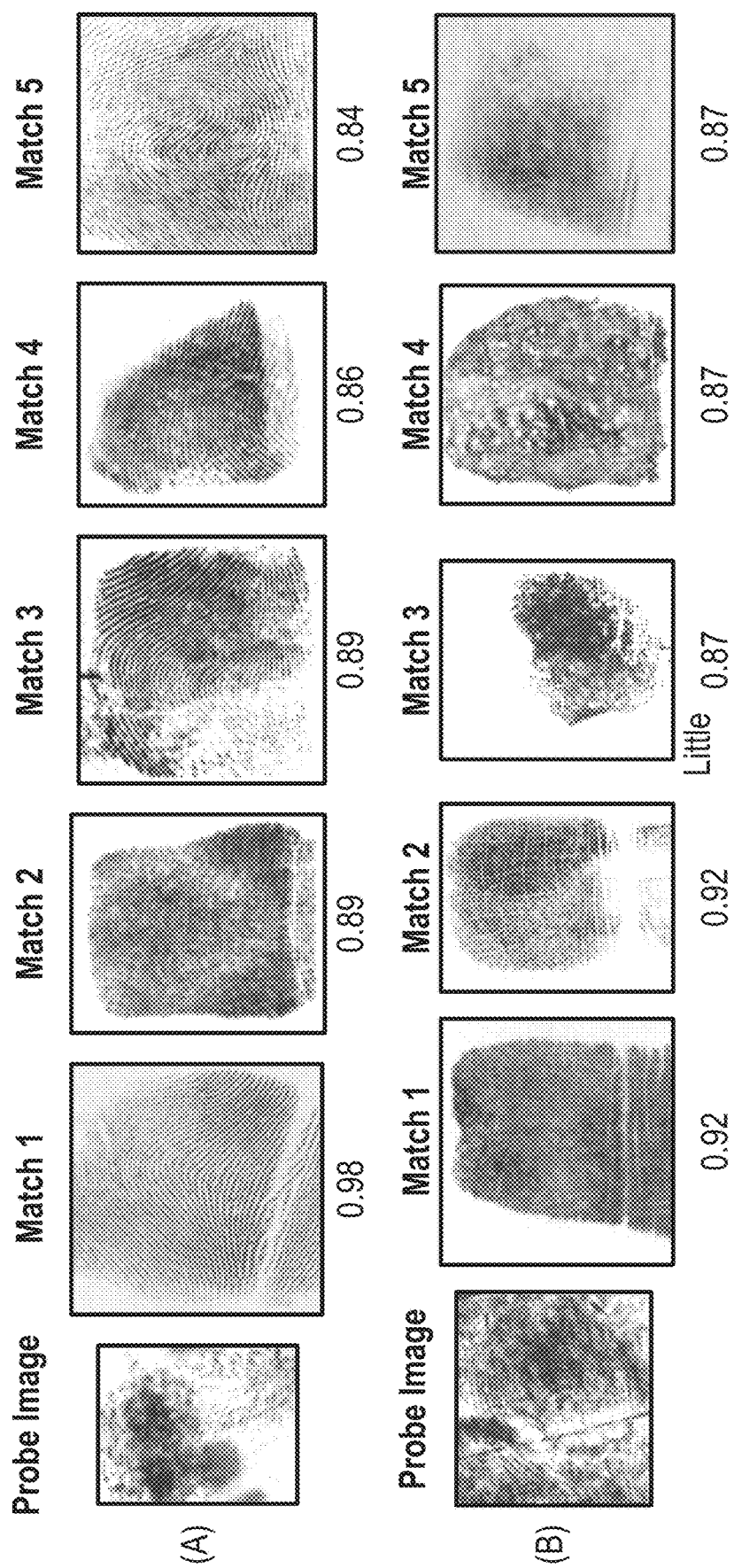
FIG. 13 is an example of successful and unsuccessful search results for the NIST SD 27 latent fingerprints.

NIST SD 27 latent fingerprint dataset and a gallery of 100K rolled fingerprints from the MSP fingerprint dataset was used to evaluate the closed-set identification (i.e., 1: N search) performance of the present models and systems. These 100K images are completely disjoint from the 448K fingerprint images from MSP used for training. According to the cumulative match characteristic (CMC) curve shown in FIG. 11 and the identification performance at specific retrieval ranks given in FIG. 12, AFR-Net is competitive with Verifinger v12.3 and outperforms all the rest of the baseline methods by a substantial margin. The rank-1 accuracy of Verifinger is 55.04%, compared to 53.10% with AFR-Net but AFR-Net surpasses Verifinger at higher retrieval ranks. The next closest performing model was ResNet101, with a rank-1 accuracy of 44.96%. Some examples image retrievals when (a) the correct mate was returned at rank-1 and (b) when the correct mate was not returned in the top five images are shown in FIG. 13. In the successful case, the latent probe image is of relatively high quality and is able to match with its corresponding mate with a similarity score far above the other returned matches; however, in the failure case, the latent image is of very poor quality and returns high similarity scores with other poor quality images in the gallery.

Despite impressive performance of the model compared to the baseline methods, latent fingerprint identification is a challenging task that requires targeted segmentation, enhancement, and matching strategies to achieve state-of-the-art (SOTA) performance, as is demonstrated in these prior latent identification studies. For the evaluation, manual bounding box annotations were used to locate the latent fingerprints prior to matching, but no other preprocessing or enhancement; thus, the performance could be further improved for latent to rolled fingerprint matching. Additionally, since no minutiae or any other fingerprint domain knowledge in designing AFR-Net 16, the AFR-Net model may be at a disadvantage compared to the SOTA latent matchers, since minutiae have been shown to be a useful feature for matching very low quality latents. Nonetheless, AFR-Net 16 still performs reasonably well compared to Verifinger, which is also not intended for latent to rolled fingerprint matching but likely does incorporate some fingerprint domain knowledge (enhancement, minutiae, etc.).

Furthermore, the fusion of the two matchers (Verifinger v12.3 plus AFR-Net) leads to a significant boost in retrieval accuracy (rank-1 accuracy of about 64% compared to 55.04% for Verifinger and 53.10% for AFR-Net). Still, there is room for improvement as the SOTA rank-1 retrieval rate for NIST SD 27 against a gallery of 100K rolled fingerprint is 65.7%. The fusion of ResNet50 and ViT was evaluated and performed worse compared to using just AFR-Net (rank 1 retrieval rate of 49.61% vs. 53.10%). Thus, not only does incorporating both architectures into one save on latency and model size, as is done in AFR-Net, it also leads to better fingerprint recognition performance over the fusion of both individual models.

Lastly, the AFR-Net model's performance for a rolled to rolled fingerprint search using NIST SD 14 was evaluated. Consistent with previous studies, the last 2,700 images from NIST SD 14 were used as probes and their corresponding mates with the same 100K rolled images from MSP as the gallery. AFR-Net achieves a rank 1 retrieval rate of 99.78%, which is an improvement over the previous SOTA performance of 99.20% by DeepPrint.

The inference speed of each method is given in FIG. 10, along with the number of parameters of each network. Of the models compared, the one with the least number of parameters is ViT (21.83M), followed by Swin (52.69M) and ResNet50 (62.21M). ViT also has the lowest latency of 4.12 ms, followed closely by ResNet50 with a latency of 4.34 ms. AFR-Net has 85.02M parameters, roughly equivalent to the number of parameters as ResNet50 and ViT combined but is still comparable to the number of parameters as ResNet101 (81.20M).

In terms of performance vs. latency trade-off, ResNet50 outperformed ResNet101 on the majority of the evaluation datasets, whereas Swin outperformed ViT on the majority of the datasets; however, at a significant cost to latency and larger number of parameters. Thus, it seems that both ResNet50 and ViT may be preferable in some applications that require smaller footprints and faster inference speed. AFR-Net performed the best overall in terms of performance; however, does have a small added latency and increase in number of parameters compared to, for example, ResNet50. However, the significant improvements in performance on many of the datasets seem to justify the added computational costs.

Lastly, the realignment stage utilizing the local embeddings does incur some additional latency, which is denoted as $t_R$. For the present implementation, the average value of $t_R$ is 29.36 ms. In addition to $t_R$, the realignment stage includes the time required for one additional inference time of the embedding network, $t_I$. However, since only the realignment stage is invoked for a fraction of the total comparisons, r, the amortized latency cost, ta, of the realignment is significantly lower and can be computed with the following equation:

$$t_A = r(t_R + 2t_I) + (1-r)t_I \quad (1)$$

For example, with a specified range of [0.3, 0.6], the realignment process for AFR-Net is invoked 17.9% (r=0.179) of the time, on average across all the datasets. Using the inference speed of AFR-Net from FIG. 10 of 8.42 ms, the total cost of AFR-Net† (AFR-Net with realignment) is 15.18 ms.

In the ablation study of the AFR-Net model, the effects of the loss function (cross entropy vs. ArcFace), training dataset size, use of a spatial transformer network (STN) for spatial alignment, and the realignment strategy was evaluated using the local feature embeddings. For the ablation on the training dataset size, the performance of the present method when trained on only a subset of the full 1.3 training images was compared. Specifically, the subset using only the publicly available fingerprint datasets was created, which included NIST SD 302, IIT Bombay Touchless and Touch-based, ManTech Phase 2, SpoofGAN, and PrintsGAN. This resulted in 760K training images, where 675K of these images are synthetic (from SpoofGAN and PrintsGAN). In comparison, the full training database consists of the same 675K synthetic images plus an additional 540K real fingerprint images.

The results of an ablation study are given in FIG. 14. The largest increase in performance is attributed to the use of ArcFace loss rather than a cross entropy loss for supervision. Interestingly, training with ArcFace loss on a subset of only publicly available training data (85K real fingerprints+675K synthetic compared to a full dataset of 540K real fingerprints+675K synthetic) achieves competitive recognition performance across all datasets, where really the benefit of additional data is seen in only the cross-sensor and latent matching scenarios. Further improvements were obtained with the incorporation of the spatial alignment network. Finally, consistent performance improvements were observed across all evaluation datasets with applying the realignment strategy, especially in the more challenging datasets such as NIST SD 302 and FVC 2002 DB3A, which have many partially overlapping fingerprints.

The AFR-Net 16 (Attention-Driven Fingerprint Recognition Network), outperforms all of the baselines in the majority of the evaluation datasets. These evaluations included intra-sensor, cross-sensor, contact to contactless, and latent fingerprint matching scenarios. Furthermore, the realignment stage using the correspondence between local embeddings extracted from intermediate feature maps of two fingerprint images consistently improved the performance across all the models, especially in challenging cases (e.g., partial overlap between the fingerprint images). The realignment strategy requires no additional training and can be applied as a wrapper to any deep learning network (CNN or attention-based). It also serves as an explainable visualization of the corresponding regions of two fingerprint images as ascertained by the network.

A query or unknown fingerprint image may be rotated N times before inputting it to the network, then the rotated images are matched with the gallery/enrolled fingerprint image. The max score is obtained from those N match scores. For example, each query image may be rotated three times, once with 90 degrees, once with 180 degrees, and once with 270 degrees rotation. Then, those four images are matched with the reference fingerprint. Of course, various numbers of images may be used. The max score of those four matches may be used. This will of course increase the latency of the matcher by N times, so it may be used only in cases where large rotations of the input fingerprint images would be expected, like in latent fingerprint matching.

Figure 15:
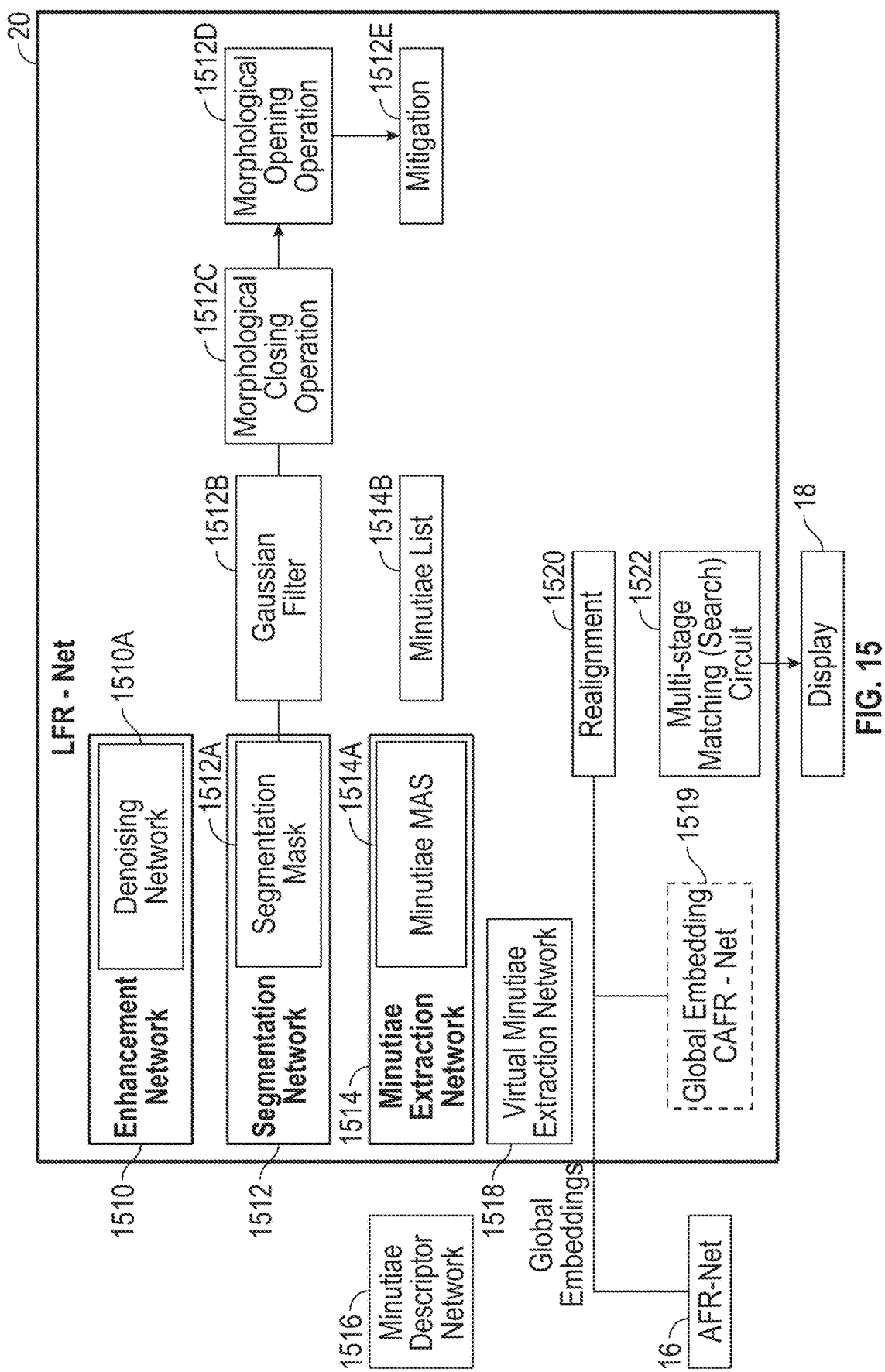
FIG. 15 is a block diagrammatic view of the LFAR-Net.

Referring now to FIG. 15, as mentioned above the AFR-Net embeddings may be used in latent fingerprint recognition using a fusion of local and global embeddings.

For accurate and efficient latent fingerprint search, a combination of local (minutiae and virtual minutiae) and global features such as AFR-Net embeddings are used. Additionally, due to the low contrast, occlusion, and varying background present in many latent fingerprint images, automatic segmentation and enhancement of latent fingerprint images prior to feature extraction is incorporated. The details of the LFR-Net system 20 are set forth. The components of the LFR include an enhancement circuit 1510, that has a denoising network 1510A, a segmentation circuit 1512, a minutiae extraction network 1514 that generates a minutiae map 1514A and a minutiae list 1514B, a minutiae descriptor network or model 1516, a virtual minutiae extraction circuit 1518, a global embedding circuit 1519 that may receive global embeddings from the AFR-Net 16 or calculate then using the AFR-Net technique is the networks are combined together, a realignment 1520 for improved global embeddings, and a multi-stage matching and search circuit 1522 for performing a multi-stage matching and search strategy as set forth in FIG. 16. It should be noted that the probe images may be subject to the processing in the various portions of the LFR-Net circuit 20. The gallery images may undergo the same processing. However, items like generating minutiae, generating virtual minutiae and generating embeddings of the gallery images may be preprocessed and stored with the gallery images.

A CNN-based minutiae extraction network 1514 is used to extract minutiae and a virtual minutiae extraction network 1518 extracts virtual minutiae sets for the first image such as the gallery image and second image such as the probe image. The minutiae descriptor network or model 1516, which extracts a fixed-length embedding for each n×n pixel patch centered around each minutia and virtual minutia obtained from the respective images. Final similarity scores are obtained via a multi-stage matching algorithm, which first compares the global descriptors and minutiae obtained from both images. Then, similarity between the virtual minutiae sets is computed in the second stage. Finally, if the similarity values are not within a desired range, a reweighting process may be performed, and similarities may again be obtained. For one-to-one comparisons, the three stages may be performed sequentially, and the final similarity score returned after all three stages or at any stage in between. For one-to-many comparisons, the matching candidate list may be reduced by some factor after each stage of comparison, to reduce the overall computation required to obtain the final, ranked similarity list.

Figure 16:
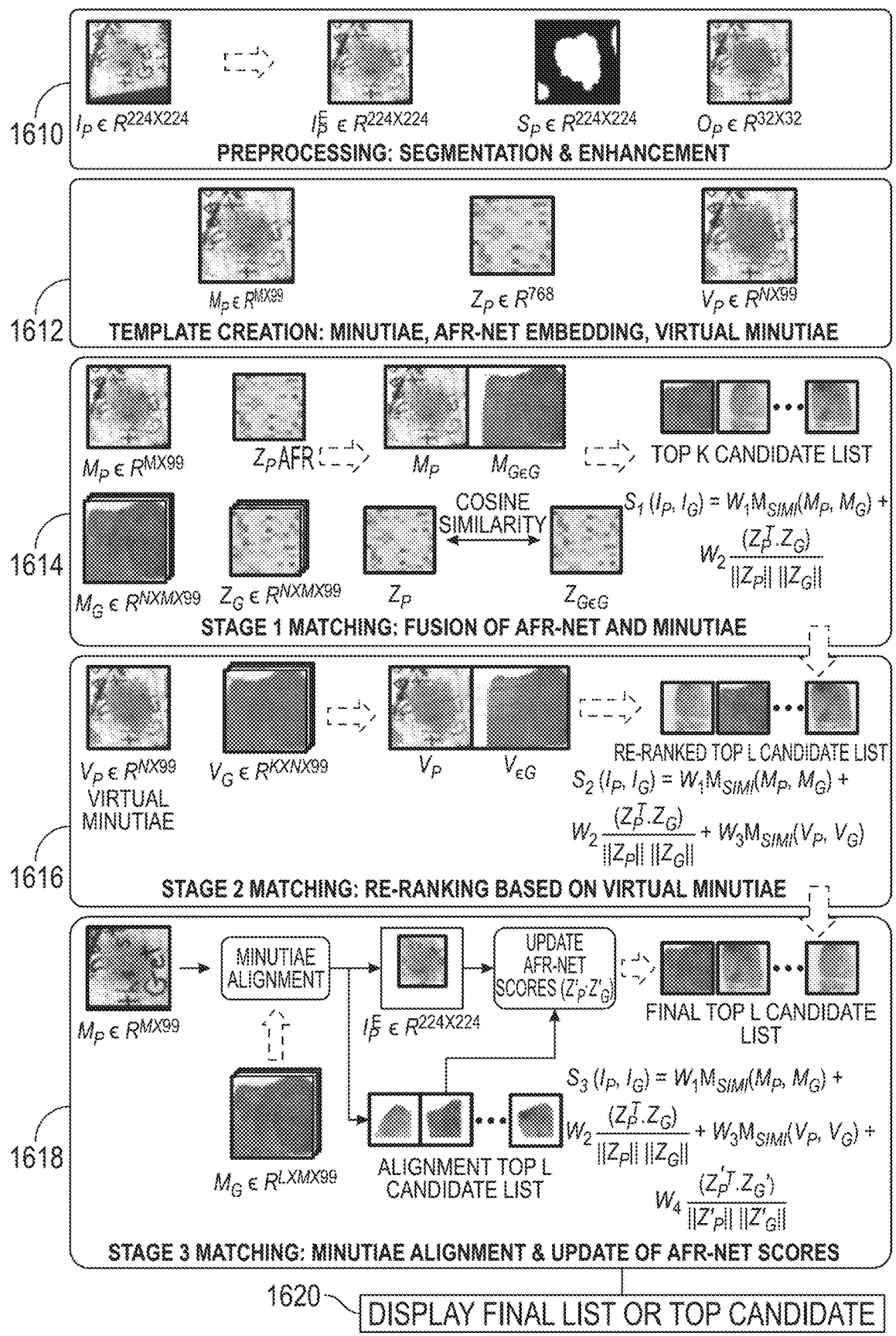
FIG. 16 is an illustrated flowchart of the process for LFAR-Net.

Referring now to FIGS. 15 and 16, an overview of the method of LFR-Net 20 is set forth. In the pre-processing step 1610 step, an input latent probe image Ip is first automatically segmented and enhanced to generate a segmented and enhance image $i_p^e$ orientation field Op, and segmentation mask Sp.

The terminology introduced for NIST SD 27 denotes the quality of latent fingerprints as either good, bad, or ugly depending on several factors, including the percentage of the fingerprint ridge structure occluded, noise obscuring the ridge background content of the image. To make things even more challenging, the quality and appearance of latent fingerprints can vary drastically across different databases, either collected in the lab (as is the case for the NIST SD 302 (N2N) and IIIT-D MOLF datasets) or from real crime scenes (as is the case for NIST SD 27 and MSP Latent datasets). Therefore, latent enhancement is a useful but challenging step for accurate and reliable latent to rolled fingerprint matching.

Figure 17:
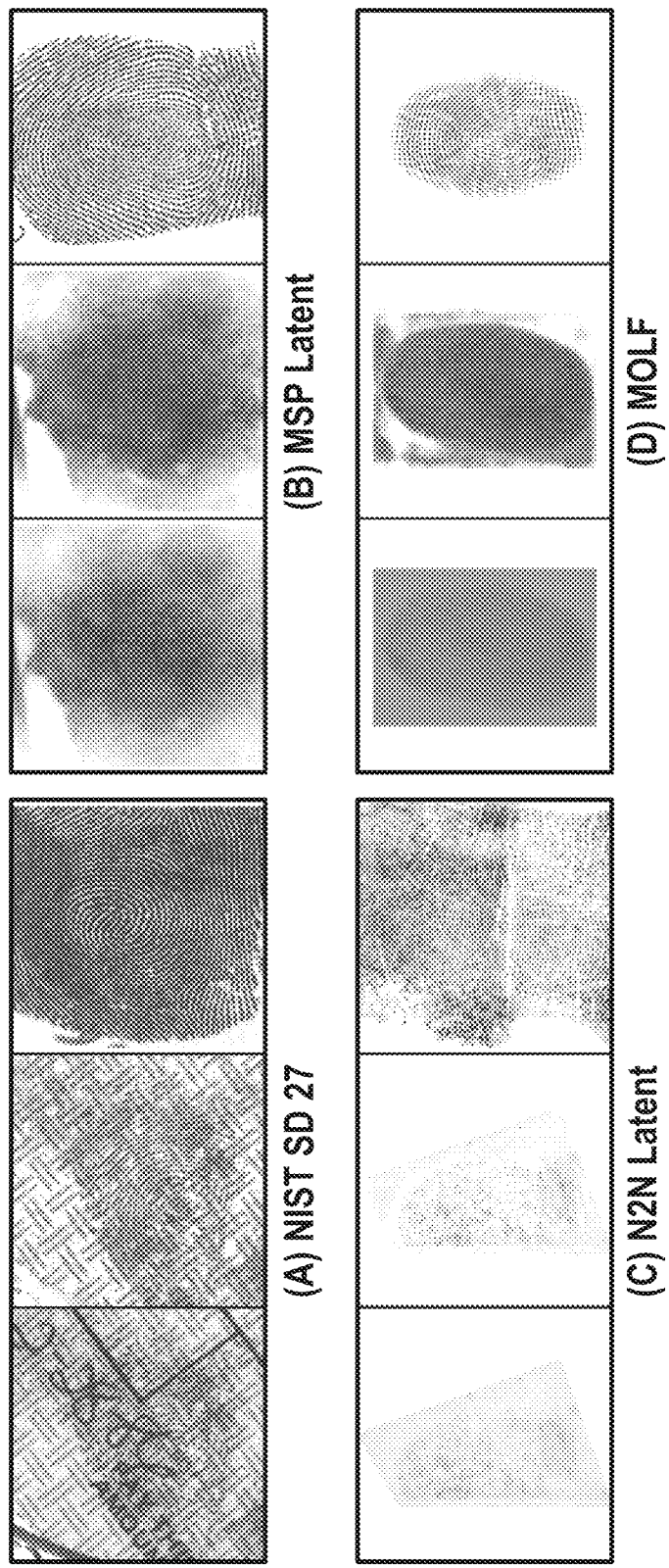
FIG. 17 is a comparison of an original latent image, an enhanced latent image and a rolled mate of four different datasets.

Referring now also to FIG. 17, latent and rolled/plain fingerprint pairs highlighting the various differences between latent datasets are set forth. Example enhanced latent images from (a) NIST SD 27, (b) MSP Latent dataset, (c) N2N Latent, and (d) MOLF datasets. In each subfigure, the left image is the original latent image, the middle image is the enhanced latent image using the proposed enhancement network, and the right image is the corresponding rolled mate.

Figure 19:
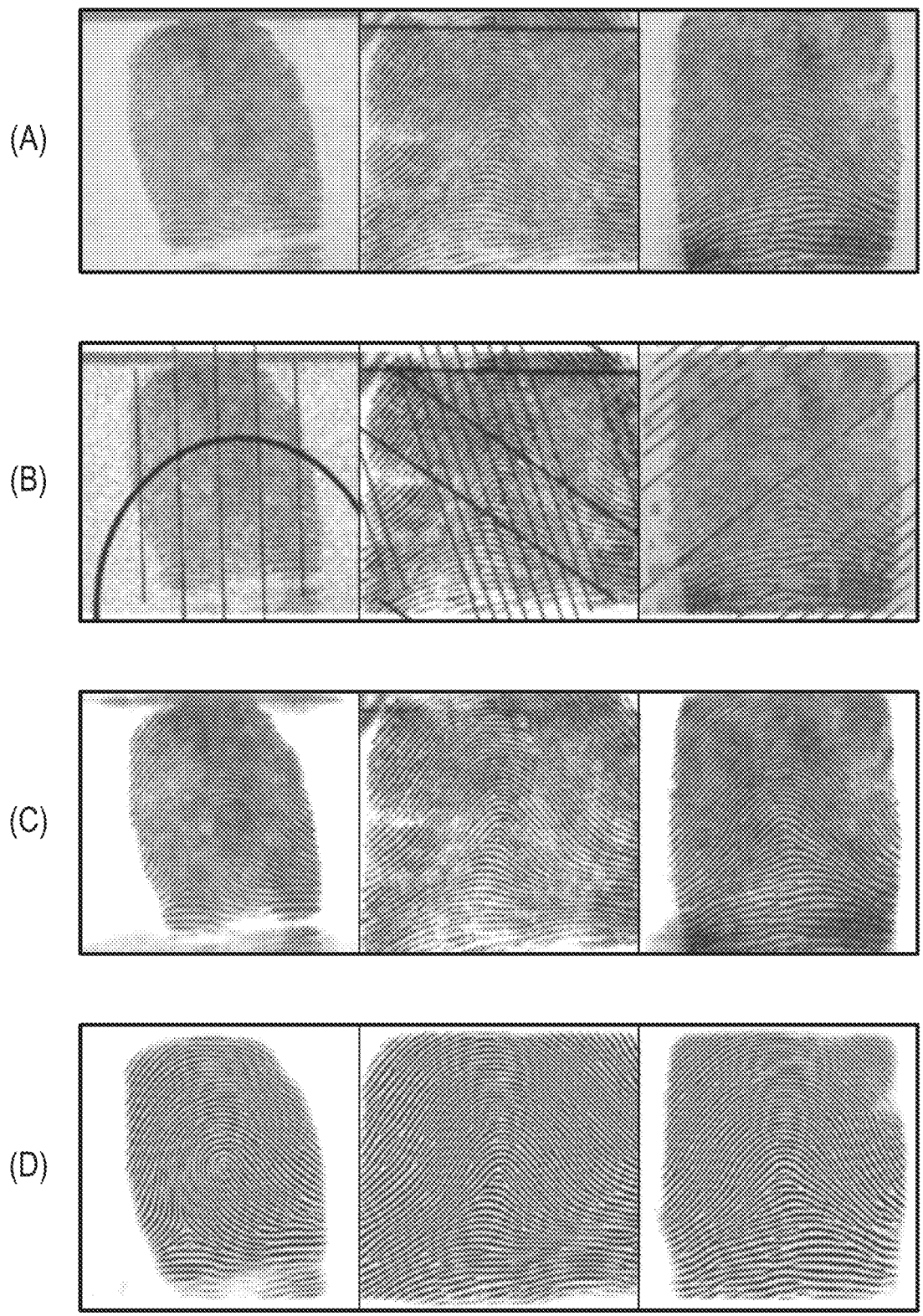
FIG. 19 is a plurality of original rolled fingerprints, simulated latent fingerprints, a predicted enhanced output and a predicted binary ridge image showing Gaussian blurring, Gaussian noise, down sampling, partial occlusions and contrast adjustments.

To address the problem of latent enhancement, two factors degrading the quality of latent prints are addressed; namely, presence of noise occluding areas of the latent fingerprint ridge structure and low contrast of the ridges. To remove noise from the latent images, the de-noising CNN network 1510A is used to remove noise and fill-in occluded regions of the fingerprint ridge structure. The de-noising network 1510A is modeled from Squeeze U-Net, an efficient network proposed for image segmentation but adapted for latent enhancement. Next, the ridge structure of the latent fingerprints by constraining the network to segment the fingerprint ridge lines from the background. To accomplish this, an additional channel is introduced to the output of the enhancement network and optimize for both tasks in a single architecture. Thus, the output of the enhancement network is two channels, one for the enhanced image and another for the ridge lines. Note, the outputs of both channels are gray-scale and in the range [0,255]. A few examples of enhancement outputs from this network are shown in the middle column of each sub-figure in FIG. 17 and the bottom two rows of FIG. 19.

Figure 18:
FIG. 18 is a mask prediction for a latent image from the NIST SD 27 gallery having an input latent image, a grey scale ridge image output by the enhancement network and a binary mask obtained after a series of Gaussian blurring, thresholding and morphological operations.

To locate and segment the latent fingerprint area from the background image content, the segmentation network 1512 uses the predicted fingerprint ridges as a segmentation mask 1512A for localizing the latent fingerprint area by performing a series of simple image processing operations. First, a Gaussian filter 1512B with kernel size 8 (5,5) is applied to the predicted ridge map, followed by a thresholding operation with a threshold of 150 on the pixel values to obtain the binary ridge lines in the range [0,1]. Next, a morphological closing operation 1512C with a kernel size of (9,9) is repeated three times, followed by three morphological opening operations 1512D with a kernel size of (9,9). Finally, the mitigation network 1512E mitigates erroneous predictions, the resulting mask defaults to the entire image if the resulting mask after processing has an area of less than 10,000 pixels. Since the enhancement network is fully convolutional, it can accept images of any resolution. However, the final segmented images are cropped to a height and width of 512×512 pixels at a resolution of 500 ppi. FIG. 18 illustrates the process of converting a predicted gray-scale ridge image to a binary segmentation mask, for an example latent fingerprint from NIST SD 27.

Due to a lack of publicly available large-scale latent databases, several data augmentations were used to mimic the distribution of latent fingerprints using a collection of rolled and slap fingerprints. These data augmentations are illustrated in (b) of FIG. 19 and consist of random amounts of Gaussian blurring, Gaussian noise, downsampling, partial occlusions, and contrast adjustments. The enhancement network is trained to remove these degradations from the augmented images via an MSE loss between the predicted, enhanced image and the original, unperturbed image. Furthermore, an additional MSE loss between the predicted ridge images and the ridge images extracted from the original input fingerprints via Verifinger v12.3 (normalized to the range [0,255]) is computed. Equal weight is given to the two MSE loss terms during training.

The enhancement network 1510, in this example, was trained on the MSP longitudinal fingerprint dataset (rolled fingerprints only), a subset of NIST SD 302 (rolled and plain fingerprints only), and a dataset of plain fingerprint impressions referred to as the MSU Self-Collection. Details on number of fingers/images contained in each of these datasets are provided in FIG. 20. Ground truth binary images for all the training images are obtained using Verifinger v12.3. The network was trained on 2 Nvidia RTX A6000 GPUs for 11 epochs utilizing an initial learning rate of 0.001, polynomial learning rate schedule, and Adam optimizer. As is shown below, despite not being trained on any real latent images, the enhancement network 1510 outperforms many of the existing latent enhancement methods in the literature.

After step 1610, step 1612 is performed in which templates to be used later a created. Probe minutiae $M_p$, AFT-Net probe embeddings $Z_p$ and probe virtual minutiae $V_p$ are formed from the segmented and enhance image $i_p^e$. As mentioned above, the gallery minutiae $M_g$, virtual minutiae $V_g$ and the gallery embeddings $Z_g$ of the probe images may be predetermined or determined at the same time as for the probe images. The enhanced image is passed to the minutiae extraction network 1514, minutiae descriptor network 1516, and AFR-Net 16 to produce a probe minutiae feature set $M_p$, virtual minutiae feature set $V_p$, and AFR-Net embeddings $Z_p$, which are embedded into a template for matching ($M_p$, $Z_p$, $V_p$) with gallery images. The probe embeddings $Z_p$ are a combination of the CNN embeddings $Z_C$ and the attention embeddings $Z_a$. Once extracted, the probe feature template is compared with each gallery template (M, Z, V) in the gallery G of size N via a similarity function $s(l_p, l_g)$, in three stages 1614, 1616 and 1618. The output final matching stage is a candidate list of L candidates that is generated and displayed on the display 18 described above. The candidate list itself or the match identity of the candidate or unknown fingerprint may be displayed.

In step 1612, the minutiae extraction network 1514 in this example uses a ResNet50 backbone, self-attention transformer layers, and a series of transpose convolutional layers to predict a 12-channel minutiae map as a representation for the probe minutiae points $M_p$.

The minutiae map 1514A is converted to the minutiae list 1514B of (x, y, θ) locations for each minutiae point, and a set of 96×96 image patches centered around each minutiae are aligned based on the orientation θ and fed into a separate ResNet50 model to extract a set of descriptors associated with each minutiae. The descriptors are each 96-dimensional and used in the minutiae similarity calculation when comparing two sets of minutiae points extracted from a given fingerprint image pair. Thus, in conjunction with the (x, y, θ) locations of each minutiae point and assuming m minutiae points in total, a given minutiae template M will be of dimension $M \in R^{m \times 99}$ $M \in R^{m \times 99}$. The architecture details of the minutiae extraction network 1514 are given in FIG. 21.

For matching minutiae points, a similarity matrix is computed between all Euclidean normalized minutiae descriptors and utilize the local similarity with relaxation (LSS-R) algorithm (such as described in the Minutiae Cylinder-Code (MCC)) to refine and remove false correspondences. Finally, the cosine similarity between the descriptors of corresponding minutiae points is summed to yield a final minutiae similarity score S1. Due to the nature of latent fingerprint formation, it is extremely useful to align the minutiae points prior to extracting the minutiae descriptors. This step imparts the similarity calculation with rotation invariance, a critical factor in unconstrained latent fingerprint recognition.

Figure 22:
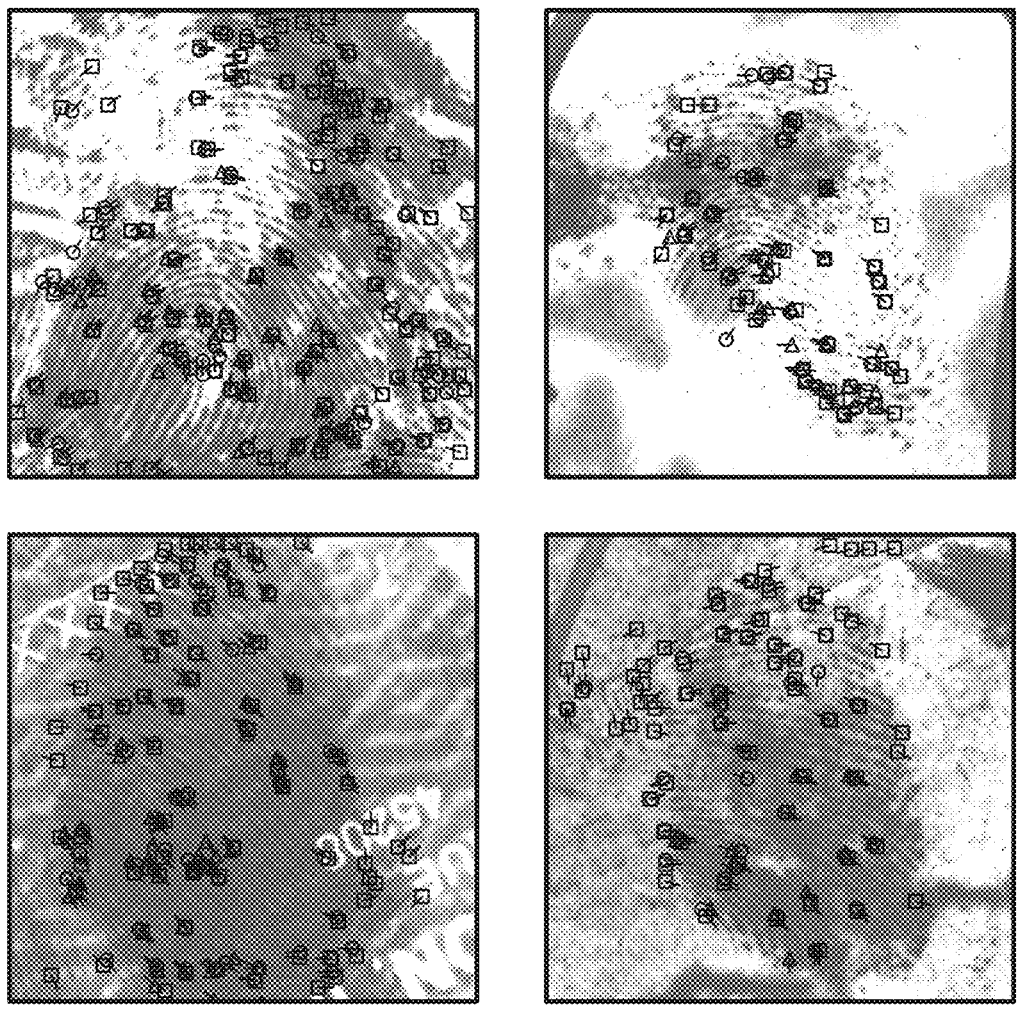
FIG. 22 is a visual comparison of minutiae extracted using LFR-Net, Verifinger and manually marked minutiae.
Figure 24:
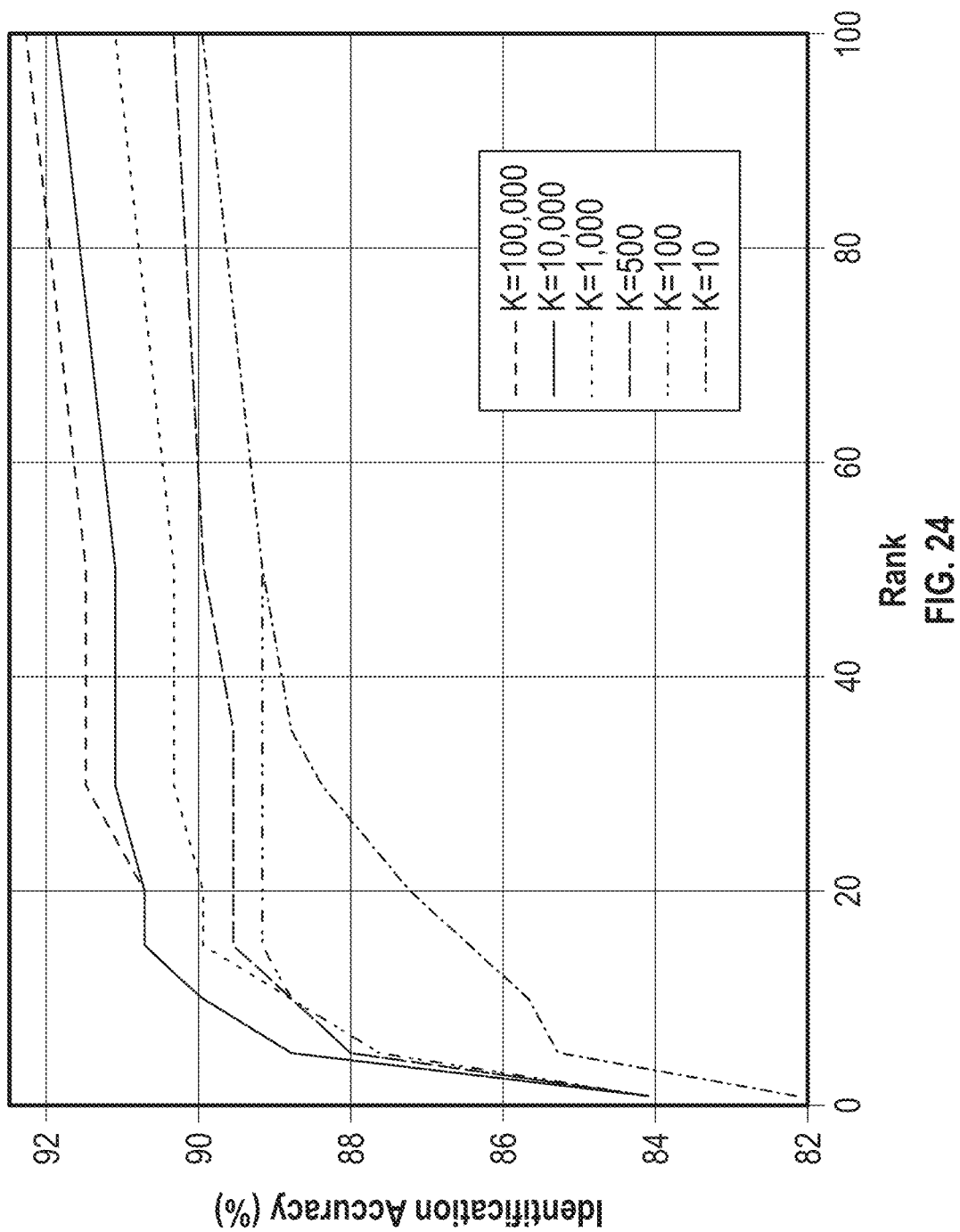
FIG. 24 is a plot of search results on the NIST SD 27 gallery showing a number of candidates, K, sent to a second stage of the LFR-Net process.

The minutiae extraction network 1514 and the minutiae descriptor network 1516 were trained on the MSP (rolled fingerprints only), NIST SD 302 (rolled and plain fingerprints only), and MSU Self-Collection (plain fingerprints only) training datasets in this example. An MSE loss between predicted and ground truth minutiae points (obtained using the commercial Innovatrics v2.4.10 SDK) was used to supervise the minutiae extraction network. For training the minutiae descriptor model, minutiae patches of size 96×96 pixels were extracted from corresponding minutiae points between multiple impressions of each finger in the training set. To ensure reliability of ground truth corresponding minutiae patches, only corresponding minutiae points common among all impressions of the same finger were used and assigned a label for training. The Additive Angular Margin (ArcFace) loss function was used to supervise the descriptor model in classifying image patches belonging to the same minutiae point. Both networks were trained on 4 Nvidia RTX A6000 GPUs for 56 epochs, with an initial learning rate of 0.0001, polynomial learning rate schedule, and Adam optimizer. A visual comparison of four example latent images annotated with minutiae from the minutiae extractor (shown as circles), Verifinger v12.3 (shown as squares), and manually marked minutiae (shown as squares) is provided in FIG. 22. Due to the difficulty in manually marking latent minutiae points, usually very few minutiae are manually annotated. On the other hand, automatic minutiae extractors tend to detect many false (e.g., spurious) minutiae due to noise in the image. Nonetheless, compared to Verifinger, the present method is detecting less spurious minutiae (as can be seen in the bottom two examples of FIG. 22.

Step 1612 also determines probe virtual minutiae, $V_p$. The operation of the virtual minutiae extraction network 1518 is set forth. Due to the severely low quality of the ridges in many latent fingerprints, minutiae extraction is often unreliable and may produce many spurious minutiae and/or fail to extract any minutiae points at all. Therefore, in order to enforce local features within the image as part of matching, virtual minutiae are used. The virtual minutiae points are evenly spaced throughout the fingerprint area and use the estimated orientation field within the neighborhood of each point as the orientation assigned to each virtual minutiae point. The ablation study below shows the effectiveness of the use of virtual minutiae.

For extracting virtual minutiae, a grid of virtual minutiae points is placed at each (x,y) location of the segmented fingerprint area, separated by 16 pixels (in both x and y directions). The orientation of each 16×16 patch assigned to each virtual minutiae is estimated using an orientation field extraction algorithm. Aligned image patches centered around each virtual minutiae are then fed to the same minutiae descriptor model described above to extract embeddings for each virtual minutiae. Since the same minutiae descriptor extraction network is used, no additional training is required to obtain the virtual minutiae points. Assuming n virtual minutiae points are extracted in total, a given virtual minutiae template V will be of dimension $V \in R^{n \times 99}$ $V \in R^{n \times 99}$. The virtual minutiae similarity calculation between two virtual minutiae templates also utilizes the LSS-R matching algorithm.

In step 1612, global embeddings for the probe image and a gallery image are determined in the AFR-Net 16. AFR-Net 16 is a combination of both CNN-based and ViT (attention-based) image recognition architectures, consisting of a shared CNN backbone and two separate classification heads (one CNN-based and the other utilizing attention blocks from ViT). The output of AFR-Net is two embeddings ($Z_a$ and $Z_c$) of 384-dimensions each and the similarity score calculation is performed via a weighted sum of the normalized dot product between both embeddings of a fingerprint pair. For simplicity, AFR-Net embeddings for the probe images are labelled as Z, which is a concatenation of the two individual embeddings $Z_c$ and $Z_a$ (764-dimensional).

AFR-Net is trained on a diverse training set consisting of a combination of rolled fingerprints, plain (i.e., slap) fingerprints, a mixture of rolled and plain fingerprints, contactless (e.g., from mobile phone cameras) fingerprints, and synthetic latent fingerprints. In total there are about 1.3 million images from 96,556 unique finger identities in training.

A strategy for improving the fingerprint representations obtained via deep learning networks is to align the regions of interest between two input images, remove background and other non-overlapping regions of the fingerprint areas in both images, and pass the aligned images back into the embedding network to yield new "refined" representations. In contrast to AFR-Net 16 described above, where the local embeddings used to find corresponding regions of interest in both images are from an intermediate layer in the AFR-Net architecture, the minutiae correspondence between two images is used to compute the affine transformation which best aligns the image pair. In a sense, the global representation is focusing on regions of the images which share many local similarities, in order to better distinguish between genuine pairs and close imposters.

A multi-stage similarity determination is performed. Each of the feature sets in LFR-Net adds complimentary information for improving the reliability of a potential match, yet incurs an additional latency cost per match, which can be prohibitively expensive on a large gallery size (e.g., N=100, 000). Typically, computing the similarity between global, fixed length feature vectors (such as AFR-Net embeddings), is extremely fast compared to local feature matching (e.g., minutiae graph similarity computation); however, performance on small area latent fingerprints suffers without the use of local features. Therefore, a multi-stage search process which reduces the size of the returned candidate list before invoking expensive local feature matching (e.g., virtual minutiae similarity computation) to refine the final ranked candidate list.

Specifically, the hierarchical matching procedure set forth herein consists of three stages. First, in the first matching step 1614, The minutiae and embeddings of the gallery images and the probe images are compared to obtain the first similarities. The top K (e.g., K=1,000) candidate matches of the gallery images are determined using a fusion of AFR-Net similarity and minutiae matching is returned in the first list. The ranking of the gallery images in the first list is based on a first similarity $S_1$ between the probe image and each of the gallery images. The similarity $S_1$ $$S_1[i], \leftarrow w_1 m_{simi}(M_p, M_g) + w_2 \frac{(Z_p^T \cdot Z_g)}{|Z_p||Z_g|}$$

As can be seen from the formula above the similarity score $S_1$ is a weighted sum based on both the minutiae M of probe image and the gallery image and the embeddings Z of the probe image and the gallery image. A first candidate list of gallery images with the highest K matching similarities is determined.

Next, in step 1616, the top K candidate list of gallery images from step 1614 is reduced using virtual minutiae matching to obtain a smaller candidate list of size L (e.g., L=500). The second candidate list (L list) is obtained as a function of virtual minutiae and minutiae. Only the L candidates are considered. A second similarity score $S_2$ is obtained for gallery image in the first list to form the second list. The second list is reduced in size from the first list. The formula for obtaining the second similarity is:

$$S_2[i] \leftarrow w_1 m_{simi}(M_p, M_g) + w_2 \frac{(Z_p^T \cdot Z_g)}{|Z_p||Z_g|} + w_3 m_{simi}(V_p, V_g)$$

As shown, the second similarity $S_2$ is a function (weighted sum) of the minutiae of the probe image $S_2$, the minutiae of the gallery image $M_g$ and the virtual minutia of the probe image $V_p$, the virtual minutiae of the gallery image $V_g$. Again, for reducing latency, only the images in the first list are considered in the second stage.

Finally, in the last stage of matching in step 1618, the probe image from is spatially aligned to each of its L candidate gallery images (using an affine transformation computed from corresponding minutiae points). The spatially aligned images obtain a new set of AFR-Net embeddings $Z_p$ based on the aligned images in order to further refine and rearrange the final candidate list. The third similarity score $S_3$ is used to sort the second list into a third list. The third similarity score is given by the formula which is a sum of the first similarities $S_1$ and $S_2$ plus a weighted element that uses the $Z'_p{}^T$ and $Z_g$ factor that:

$$S_3[i] \leftarrow w_1 m_{simi}(M_p, M_g) + w_2 \frac{(Z_p^T \cdot Z_g)}{|Z_p||Z_g|} + w_3 m_{simi}(V_p, V_g) + w_4 \frac{Z_p'^T \cdot Z_g'}{|Z_p'||Z_g'|}$$

The second list of gallery images is then sorted to obtain a final list for consideration based on the third similarity score S_3 is obtained and displayed in step 1620. A top candidate with the highest similarity score may be displayed instead.

The similarity scores $S_{1-3}$ after each stage of matching are normalized to the range [0,1] based on a set of weights ($w_1$=0.4, $w_2$=0.4, $w_3$=0.18, and $w_4$=0.02) determined empirically on a validation set of latent fingerprints from the MSP latent database (which is separate from the MSP latent test dataset). The overall algorithm for LFR-Net 20 is given in FIG. 23.

Latency is one aspect for large-scale identification applications, which tends to be in competition with accuracy. Thus, there is a motivation to find a balance between accuracy and speed using a multi-stage search protocol, which has also been explored in previous works on fingerprint identification. For a quantitative analysis on the latency of the approach, the size of the gallery is denoted as N (e.g., N=100,000) and the size of the probe dataset as Q (e.g., Q=258 in the case of NIST SD 27). Furthermore, the LFR-Net process has three stages of matching with variable number of top candidates per probe passed to subsequent stages, the number of candidates per probe image passed from the first stage to the second stage is denoted as K and the number of candidates passed to the third stage as L.

For the first stage matching, AFR-Net and minutiae features are used to obtain a short list of top K candidates from the gallery for each probe fingerprint image. This stage takes on average $t_1$=0.015 ms for a single latent to rolled comparison when utilizing 128 threads on an AMD EPYC 7543 32-Core Processor, where a total of N×Q comparisons are computed. In the second stage, virtual minutiae scores are used to re-rank the K list of candidates per latent and return a further condensed list of top L candidates to pass to the third stage. Here, a single virtual minutiae comparison between a latent and rolled image pair takes on average $t_2$=0.984 ms, where a total of K×Q comparisons are computed. Finally, the third stage consists of re-aligning each of the L candidate images for each probe using the pairwise minutiae correspondences and recomputing AFR-Net scores for each pair. In this stage, there are a total of L×Q comparisons required, where each realignment plus AFR-Net inference per comparison takes an average of $t_3$=8.626 ms. Note, the latency of stage 1 and stage 2 depends on the number of minutiae and virtual minutiae extracted per latent probe, respectively. The latency numbers reported here are computed for NIST SD 27 against a gallery augmented by 100,000 rolled fingerprints, where the average number of minutiae and virtual minutiae extracted per latent image is 45 and 363, respectively, and the average number of minutiae and virtual minutiae per rolled fingerprint is 119 and 886, respectively. In total, the average latency t per comparison for the entire three stage matching process can be computed using Equation 2.

$$t = t_1 + \frac{K}{N}t_2 + \frac{L}{N}t_3 \qquad (2)$$

Using Equation 2 with N=100,000, K=1000 and L=500, the average latent to rolled comparison across each of the four latent datasets for the full matching pipeline takes about t=0.068 ms. As mentioned previously, the filtering of the candidate lists in each stage does incur some accuracy trade-off; however, filtering 99% of the candidate list prior to stage 2 (with K=1,000 and N=100,000) leads to no difference in rank-1 retrieval rate for NIST SD 27 and only about a 1% decrease in accuracy at higher ranks. A plot of the Cumulative Match Characteristic (CMC) for NIST SD 27 on a gallery of 100,000 as the value of K is varied from 100,000 to 10 is shown in FIG. 23.

The feature extraction speed is often less of a concern for fingerprint recognition since templates for the gallery can be extracted offline prior to matching; however, is still important in cases of updating the gallery for future improvements to the system. Nonetheless, the method is significantly faster compared to the baseline MSU-AFIS algorithm, taking just 553 ms on average per latent image or 1.88 images per second. In terms of template size, the algorithm is comparable to MSU-AFIS for latents; however, for rolled templates, MSU-AFIS performs several template compression and quantization techniques to reduce the size of the templates compared to the present disclosure, which can also be incorporated into the algorithm in future work.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

In this application, including the definitions below, the term "module," "network" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method comprising:
generating a first set of feature embeddings for a first image at a feature extractor;
generating a second set of feature embeddings for a second image at the feature extractor;
generating a third set of embeddings at a first classification head from the first set of feature embeddings;
generating a fourth set of embeddings at a second classification head from the first set of feature embeddings;
generating a fifth set of embeddings at the first classification head from the second set of feature embeddings;
generating a sixth set of embeddings at the second classification head from the second set of feature embeddings;
generating a first similarity score based on the third set of embeddings and the fourth set of embeddings and the fifth set of embeddings and the sixth set of embeddings; and
generating a similarity indicator based on the first similarity score.

2. The method of claim 1 further comprising comparing the similarity score to a first similarity score threshold and wherein generating the first similarity score comprises generating the similarity indicator when the similarity is above the first similarity score threshold.

3. The method of claim 1 wherein when the first similarity score is between a second similarity score threshold and the first similarity score threshold, masking the first image to form a first masked image and the second image to form a second masked image.

4. The method of claim 3 wherein prior to masking the first image and the second image, performing an affine transformation of the first image and the second image.

5. The method of claim 3 further comprising determining seventh embeddings for the first masked image at the first classification head;
determining an eighth set of embeddings for the first masked image at the second classification head;
determining a ninth embeddings for the second masked image; at the first classification head determining a tenth embeddings for the second masked image at the second classification head;
generating a second similarity score between the seventh and eighth embeddings and the ninth and tenth embeddings;
generating a second similarity indicator based on the second similarity score.

6. The method of claim 5 further comprising weighting first similarity score to form a first weighted similarity score and weighting the second similarity score to form a second weighted similarity score and combining the first weighted similarity score and the second weighted similarity score to form a final weighted similarity score.

7. The method of claim 1 wherein prior to generating the first set of feature embeddings and generating the second set of embeddings, spatially aligning the first image and the second image at a shared alignment module.

8. The method of claim 7 wherein spatially aligning comprises performing an affine transformation.

9. The method of claim 1 wherein the first classification head comprises a convolutional neural network and the second classification head comprises an attention-based classification head.

10. The method of claim 1 wherein the feature extractor comprises a convolutional neural network feature extractor encoder.

11. A method comprising:
generating probe minutiae from a probe image;
generating probe embeddings from the probe image;
generating probe virtual minutiae from the probe image;
generating gallery minutiae from the gallery images;
generating gallery embeddings from the gallery images;
generating gallery virtual minutiae from the gallery images;
generating first similarity scores based on the probe embeddings, the gallery embeddings, the probe minutiae and the gallery minutiae;
forming a first list of gallery images based on the first similarity score;
determining a second similarity scores score based on the virtual minutiae;
rearranging the first list to form a second list based on the second similarity scores;
spatially aligning the gallery image to form aligned images and the probe image for the gallery images in the second list;
generating third similarity scores based on the aligned images and the probe image; and
displaying a third list or a single match of a gallery image based on the third similarity scores.

12. The method of claim 11 further comprising enhancing a probe fingerprint image to form an enhanced image prior to generating the probe minutiae, generating the probe embeddings and generating the probe virtual minutiae.

13. The method of claim 12 wherein enhancing the probe image comprises removing noise.

14. The method of claim 12 wherein enhancing the probe image comprises filling-in occluded regions.

15. The method of claim 12 wherein enhancing the probe image comprises removing noise and filling-in occluded regions.

16. The method of claim 12 further comprising segmenting the enhanced image to form an enhanced and segmented image.

17. The method of claim 16 wherein enhancing the image generates predicted ridge lines.

18. The method of claim 17 wherein segmenting comprises segmenting the enhanced image based on the predicted ridge lines.

19. The method of claim 16 wherein segmenting comprises Gaussian filtering, a morphological opening operation and a morphological closing operation.

20. The method of claim 16 wherein the first list comprises a predetermined number of elements greater than the second list.

21. The method of claim 17 wherein probe embedding is performed using CNN classification head and an attention-based classification head.

22. A system comprising:
a processor; and
a non-transitory computer readable medium that includes machine-readable instructions that are executable by the processor, the machine-readable instructions when executed perform the steps of;

generating probe minutiae from a probe image;

generating probe embeddings from the probe image;

generating probe virtual minutiae from the probe image;

generating gallery minutiae from gallery images;

generating gallery embeddings from the gallery images;

generating gallery virtual minutiae from the gallery images;

generating first similarity scores based on the probe embeddings, the gallery embeddings, probe minutiae and the gallery minutiae;

forming a first list of gallery images based on the first similarity score;

determining a second similarity scores score based on the virtual minutiae;

rearranging the first list to form a second list based on the second similarity scores;

spatially aligning the gallery image to form aligned images and the probe image for the gallery images in the second list;

generating third similarity scores for the similarity scores based on the aligned images and the probe image; and displaying a third list or a single match of a gallery image based on the third similarity scores.

* * * * *